US008378295B2

(12) United States Patent
Whitehouse et al.

(10) Patent No.: US 8,378,295 B2
(45) Date of Patent: Feb. 19, 2013

(54) ATMOSPHERIC PRESSURE ION SOURCE PERFORMANCE ENHANCEMENT

(75) Inventors: Craig M. Whitehouse, Branford, CT (US); Thomas White, Clinton, CT (US); Shida Shen, Branford, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 13/078,578

(22) Filed: Apr. 1, 2011

(65) Prior Publication Data

US 2011/0287554 A1 Nov. 24, 2011

Related U.S. Application Data

(63) Continuation of application No. 12/251,058, filed on Oct. 14, 2008, now Pat. No. 7,919,746.

(60) Provisional application No. 60/980,225, filed on Oct. 16, 2007.

(51) Int. Cl.
*B01D 59/44* (2006.01)

(52) U.S. Cl. ......................... 250/288; 250/281; 250/282

(58) Field of Classification Search .................. 250/281, 250/282, 288
See application file for complete search history.

(56) References Cited

U.S. PATENT DOCUMENTS

| | | | | |
|---|---|---|---|---|
| 5,505,832 | A | 4/1996 | Laukien et al. | |
| 6,396,057 | B1 | 5/2002 | Jarrell et al. | |
| 6,831,271 | B1 | 12/2004 | Guevremont et al. | |
| 6,878,819 | B1 * | 4/2005 | Natunen | 536/53 |
| 2003/0201390 | A1 | 10/2003 | Corso et al. | |
| 2004/0041093 | A1 | 3/2004 | Schultz et al. | |
| 2004/0072337 | A1 | 4/2004 | Moon et al. | |
| 2004/0209251 | A1 * | 10/2004 | Schneider et al. | 435/6 |
| 2005/0258360 | A1 | 11/2005 | Whitehouse et al. | |
| 2006/0255261 | A1 | 11/2006 | Whitehouse et al. | |
| 2007/0154900 | A1 * | 7/2007 | Schneider et al. | 435/6 |
| 2008/0047330 | A1 | 2/2008 | Whitehouse et al. | |
| 2009/0008547 | A1 * | 1/2009 | Whitehouse et al. | 250/288 |
| 2009/0095899 | A1 * | 4/2009 | Whitehouse et al. | 250/282 |

FOREIGN PATENT DOCUMENTS

| | | |
|---|---|---|
| JP | 2006 053131 | 2/2006 |
| WO | WO 2006/062471 | 6/2006 |

OTHER PUBLICATIONS

Astorga-Wells, Microfluidic Electrocapture Technology in Protein and Peptide analysis, Dissertaions from Karolinska Institute, Stockholm, Sweden, 2004.

Buryakov et al., "A new method of separation of multiatomic ions by mobility at atmospheric pressure using a high-frequency amplitude-asymmetric strong electric field," Intl. J. Mass. Spec., 128(3):143-148, 1993.

U.S. Appl. No. 60/840,095, filed Aug. 25, 2006.

European Search report dated Sep. 3, 2010, for corresponding EP Application No. 08253346.4, filed on Oct. 16, 2008.

* cited by examiner

*Primary Examiner* — David A Vanore
(74) *Attorney, Agent, or Firm* — Fish & Richardson P.C.

(57) ABSTRACT

Species that may be required to enhance an upstream sample preparation or separation process may be less compatible with the downstream electrospray (ES) processes and cause reduction in mass spectroscopy (MS) signal. New electrolytes have been found that increase positive and negative polarity analyte ion signal measured in ESMS analysis when compared with analyte ESMS signal achieved using more conventional electrolytes. The new electrolyte species increase ES MS signal when added directly to a sample solution or when added to a second solution flow in an electrospray membrane probe, it has also been found that running the ES membrane probe with specific electrolytes in the second solution of the ES membrane probe have been found to enhance ESMS signal compared to using the same electrolytes directly in the sample solution being electrosprayed. The new electrolytes can be added to a reagent ion source configured in a combination atmospheric pressure ion source to improve ionization efficiency.

10 Claims, 18 Drawing Sheets

100 pg/µl Reserpine in 3:7 ACN:$H_2O$ varying the concentration of $NH_4OH$ from 0.005% to 1.0% in solution 2 of the membrane probe at a sample solution flowrate of 10 ul/min compared with adding $NH_4OH$ directly to sample solution.

ATMOSPHERIC PRESSURE ION SOURCE PERFORMANCE ENHANCEMENT

RELATED APPLICATIONS

This application is a continuation of U.S. application Ser. No. 12/251,058, filed on Oct. 14, 2008, and issued as U.S. Pat. No. 7,919,746, which claims the benefit of U.S. Provisional Patent Application Ser. No. 60/980,225, filed on Oct. 16, 2007, the entire contents both of which are incorporated herein by reference.

FIELD OF INVENTION

This invention relates to the field of Atmospheric Pressure Ion (API) sources interfaced to mass spectrometers. Such API sources include but are not limited to electrospray, Atmospheric Pressure Chemical Ionization (APCI), combination ion sources, Atmospheric Pressure Charge Injection Matrix Assisted Laser Desorption, DART and DESI. The invention comprises the use of new electrolyte species and specific electrolyte species in the second solution of an ES membrane probe to enhance the analyte ion signal generated from these API sources interfaced to mass spectrometers.

BACKGROUND OF THE INVENTION

Charged droplet production unassisted or pneumatic nebulization assisted Electrospray (ES) requires oxidation of species (positive ion polarity ES) or reduction of species (negative ion polarity) at conductive surfaces in the sample solution flow path. When a metal electrospray needle tip is used that is electrically connected to a voltage or ground potential, such oxidation or reduction reactions (redox) reactions occur on the inside surface of the metal electrospray needle during electrospray ionization. If a dielectric electrospray tip is used in electrospray ionization, redox reactions occur on an electrically conductive metal surface contacting the sample solution along the sample solution flow path. This conductive surface typically may by a stainless steel union connected to a fused silica electrospray tip. The electrospray sample solution flow path forms one half cell of an electrochemical or voltaic cell. The second half of the electrochemical cell formed in electrospray operates in the gas phase. Consequently, operating rules that explain or predict the behavior of liquid to liquid electrochemical cells may be applied to explain a portion of the processes occurring in electrospray ionization. The electrolyte aids in promoting redox reactions occurring at electrode surfaces immersed in liquid in electrochemical cells. The electrolyte not only plays a role in the initial redox reactions required to form single polarity charged liquid droplets but also fundamentally affects the production of sample related ions from rapidly evaporating liquid droplets and their subsequent transport through the gas phase into vacuum. Additional charge exchange reactions can occur with sample species in the gas phase. The mechanism by which the electrolyte affects liquid and gas phase ionization of analyte species is not clear.

The type and concentration of electrolyte species affects ES ionization efficiency. The electrolyte type and concentration and sample solution composition will affect the dielectric constant, conductivity and pH of the sample solution. The relative voltage applied between the Electrospray tip and counter electrodes, the effective radius of curvature of the electrospray tip and shape of the emerging fluid surface determine the effective electric field strength at the electrospray needle tip. The strength of the applied electric field is generally set just below the onset of gas phase breakdown or corona discharge in electrospray ionization. With an effective upper bound on the electric field that is applied at the electrospray tip during electrospray operation, the electrospray total ion current is determined by the solution properties as well as the placement of the conductive surface along the sample solution flow path. The effective conductivity of the sample solution between the nearest electrically conductive surface in contact with the sample solution and the electrospray tip plays a significant in determining the electrospray total ion current. It has been found with studies using electrospray membrane probes that the ESMS analyte signal can vary significantly with electrospray total ion current. A description of the electrospray membrane probe is given in U.S. patent application Ser. Nos. 11/132,953 and 60/840,095 and incorporated herein by reference.

ES signal is enhanced when specific organic acid species such as acetic and formic acids are added to organic and aqueous solvents. Conversely, ES signal is reduced when inorganic acids such as hydrochloric or trifluoroacetic acid are added to electrospray sample solutions. Although mechanisms underlying variation in electrospray ionization efficiency due to different electrolyte counter ion species have been proposed, explanations of these root modulators underlying electrospray ionization processes remain speculative. Conventional electrolytes added to sample solutions in electrospray ionization are generally selected to maximize electrospray MS analyte ion signal. Alternatively, electrolyte species and concentrations are selected to serve as a reasonable compromise to optimize upstream sample preparation or separation system performance and downstream electrospray performance. Trifluoroacetic acid may be added to a sample solution to improve a reverse phase gradient liquid chromatography sample separation but its presence will reduce the electrospray MS signal significantly compared with electro spraying with an organic electrolyte such as formic or acetic acid added to the sample solution. Generally for polar analyte species, the highest electrospray MS signal will be achieved using a polar organic solvent such as methanol in water with acetic or formic acid added as the electrolyte. Typically, a 30:70 to 50:50 methanol to water ratio is run with acetic or formic acid concentrations ranging from 0.1% to over 1%. Running non polar solvents, such as acetonitrile, with water will reduce the ESMS signal for polar compounds and adding inorganic acid will reduce ESMS signal compared to the signal achieved using a polar organic solvent in water with acetic or formic acid. Several species of acids bases and salts have been used at different concentrations and in different solvent compositions as electrolyte species in electrospray ionization to maximize ESMS analyte species. For some less polar analyte samples that do not dissolve in aqueous solutions, higher ESMS signal is achieved running the sample in pure acetonitrile with an electrolyte. For compounds such as carbohydrates with low or no proton affinity, adding a salt electrolyte may product higher ESMS signal.

The invention comprises using a new set of electrolyte species in electrospray ionization to improve the electrospray ionization efficiency of analyte species compared with ES ionization efficiency achieved with conventional electrolyte species used and reported for electrospray ionization. Electrospraying with the new electrolyte species increases ESMS analyte signal amplitude by a factor of two to ten for certain analyte species compared to the highest ESMS signal achieved using acetic or formic acids for these sample species. ESMS signal enhancements have been achieved whether the new electrolytes are added directly to the sample solution or added to the second solution of an electrospray membrane probe. When convention acid or salt electrolytes added to the sample solution are electrosprayed in positive polarity mode, the anion from these electrolytes does not readily appear in the positive ion spectrum. As expected, the anion of these electrolytes does appear in the negative ion polarity ESMS spectrum. One distinguishing characteristic of the new electrolytes comprising the invention is that a characteristic protonated or deprotonated parent related ion from the electrolyte species appears in both positive and negative polarity spectrum acquired using electrospray ionization. The positive polarity electrolyte ion appearing in the positive polarity electrospray mass spectrum is the $(M+H)^+$ species with the $(M-H)^-$ species appearing in the negative polarity electrospray mass spectrum.

An alternative embodiment of the invention is the addition of certain electrolytes into the second solution of an electrospray membrane probe to enhance the ESMS signal amplitude of certain analyte species added to the sample solution flow. The alternative embodiment of the invention increases the ESMS signal compared to the ESMS signal amplitude achieved when the same electrolyte species are added directly to the sample solution during electrospray ionization.

SUMMARY OF THE INVENTION

One embodiment of the invention comprises conducting electrospray ionization of an analyte species with MS analysis where at least one of a new set of electrolytes including but not limited to benzoic acid, cyclohexanecarboxylic acid or trimethyl acetic acid is added directly to the sample solution. The electrolyte may be included in the sample solution from its fluid delivery system or added to the sample solution near the electrospray tip through a tee fluid flow connection.

Another embodiment of the invention is running at least one of a set of new electrolytes including but not limited to benzoic acid, cyclohexanecarboxylic acid or trimethyl acetic acid in the second solution flow of an electrospray membrane probe during electrospray of the sample solution. The concentration of the new electrolyte can be varied or scanned by running step functions or gradients through the second solution flow path. The second solution flow is separated from the sample solution flow by a semipermeable membrane that allows reduced concentration transfer of the new electrolyte into the sample solution flow during electrospray ionization with MS analysis.

Another embodiment of the invention is running at least one of a set of new electrolytes including but not limited to benzoic acid, cyclohexanecarboxylic acid or trimethyl acetic acid in the second solution of an electrospray membrane probe during electrospray of the sample solution that contains a second electrolyte species. The addition of the new electrolyte to the second solution flow increases the electrospray MS signal even if the second electrolyte species, when used alone, reduces the ESMS analyte signal. The concentration of the new electrolyte in the second solution flow can be step or ramped to maximize analyte ESMS signal.

Another embodiment of the invention is running ammonium hydroxide ($NH_4OH$) and/or sodium hydroxide (NaOH) electrolytes (base electrolytes) in the second solution of an ES membrane probe during negative polarity ES ionization to increase the negative polarity ESMS ion signal of analyte species running in the sample solution flow. This embodiment of the invention provides increased ion signal for certain sample species when compared with the ESMS negative polarity ion signal achieved when ammonium hydroxide and/or sodium hydroxide electrolytes are added directly to the sample solution during negative ion polarity electrospray ionization.

Another embodiment of the invention comprises running at least one of a set of new electrolytes including but not limited to benzoic acid, cyclohexanecarboxylic acid or trimethyl acetic acid or the base electrolytes including but not limited to ammonium hydroxide and/or sodium Hydroxide in the downstream membrane section second solution flow of a multiple membrane section electrospray membrane probe during Electrospray ionization with MS analysis. One or more membrane sections can be configured upstream in the sample solution flow path from the downstream electrospray membrane probe. Electrocapture and release of samples species using upstream membrane sections can be run with electrolyte species that optimize the electrocapture processes independently while a new electrolyte species is run through the downstream membrane section second solution flow to optimize electrospray ionization efficiency of the analyte species.

In yet another embodiment of the invention, at least one of the new electrolytes including but not limited to benzoic acid, cyclohexanecarboxylic acid or trimethyl acetic acid are added to the sample solution in a single APCI inlet probe or sprayed from a second solution in a dual APCI inlet probe to enhance the ion signal generated in atmospheric pressure corona discharge ionization.

In another embodiment of the invention, at least one of the new electrolytes including but not limited to benzoic acid, cyclohexanecarboxylic acid or trimethyl acetic acid are added to the solution electrosprayed from a reagent ion source comprising an electrospray ion generating source configured in a combination ion source including electrospray ionization and/or atmospheric pressure chemical ionization.

In yet another embodiment of the invention, at least one of the new electrolytes including but not limited to benzoic acid, cyclohexanecarboxylic acid or trimethyl acetic acid are added to the solution that is nebulized followed by corona discharge ionization forming a reagent ion source configured in a combination ion source including electrospray ionization and/or atmospheric pressure chemical ionization.

BRIEF DESCRIPTION OF THE INVENTION

Figure 10:
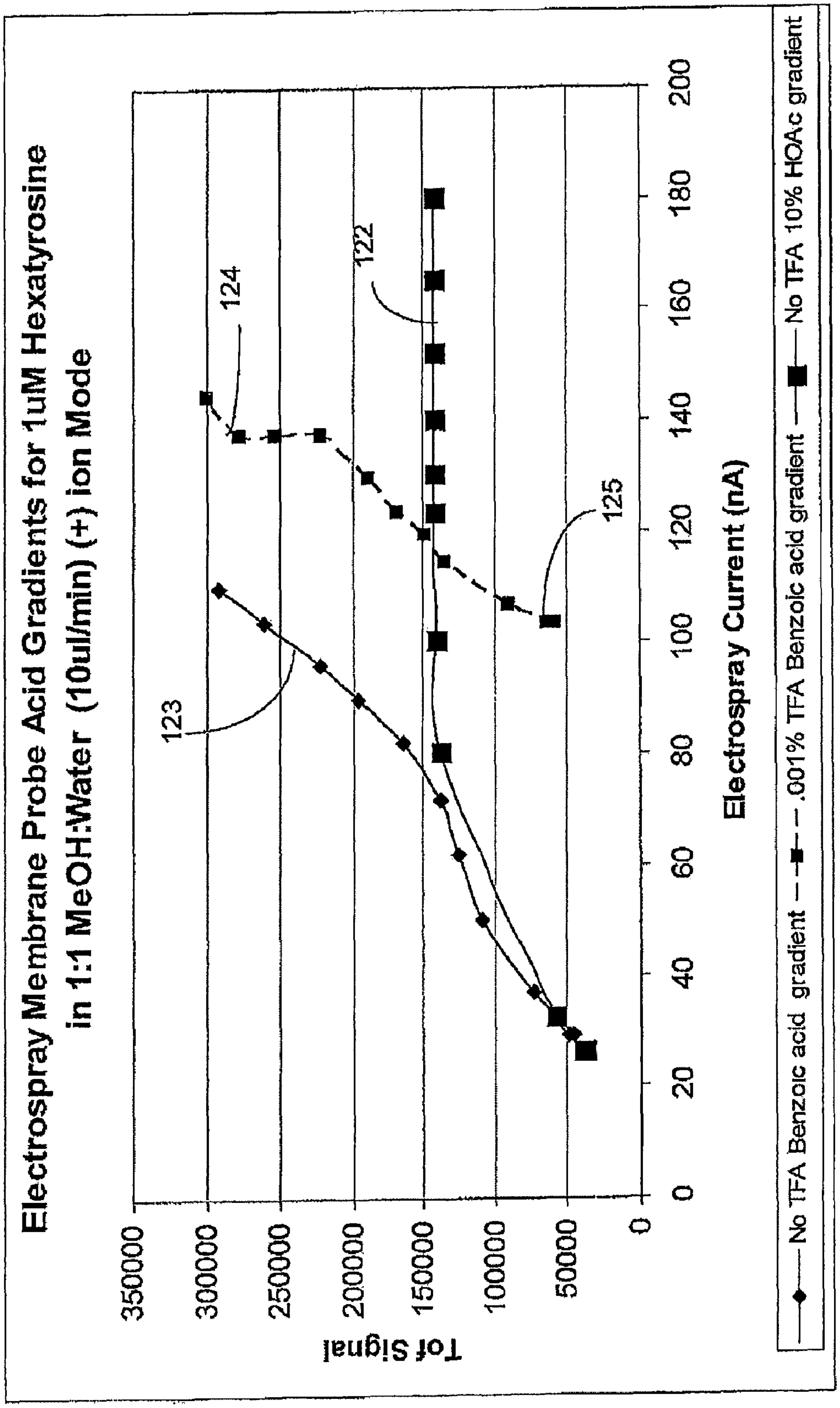

FIG. 10 shows a set of ESMS signal curves comparing positive polarity ESMS ion signal of a 1 μM hexatyrosine in a 1:1 methanol:water solution electrosprayed at a flow rate of 10 μl/min while running acetic acid and benzoic acid electrolyte concentration gradients in the electrospray membrane probe second solution flow with pure solvent sample solutions and with 0.001% trifluoroacetic acid added to the sample solution.

Figure 11:
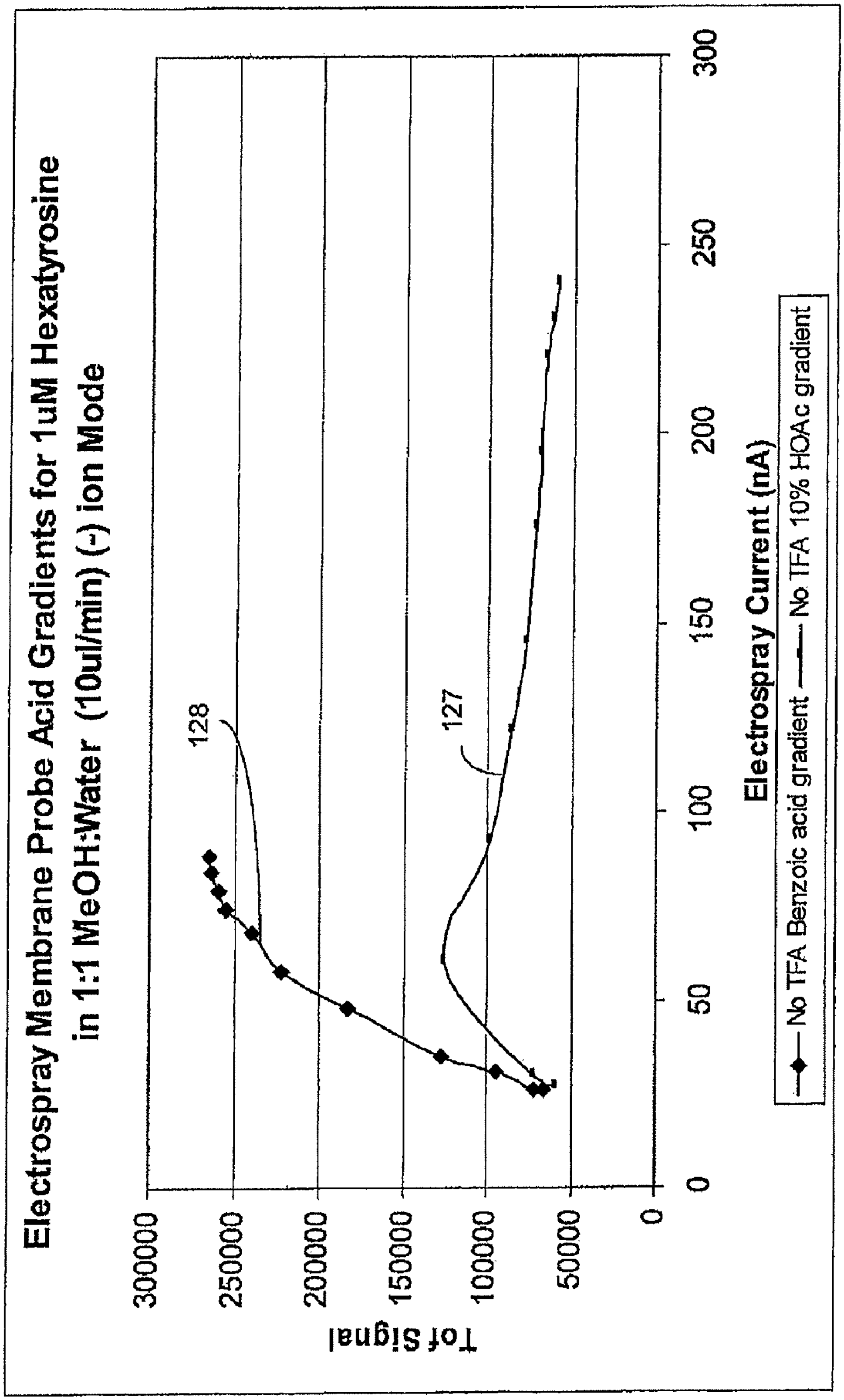

FIG. 11 shows a set of ESMS signal curves comparing negative polarity ESMS ion signal of a 1 μM hexatyrosine in a 1:1 methanol:water solution electrosprayed at a flow rate of 10 μl/min while running acetic acid and benzoic acid electrolyte concentration gradients in the electrospray membrane probe second solution flow with pure solvent sample solutions.

Figure 12:
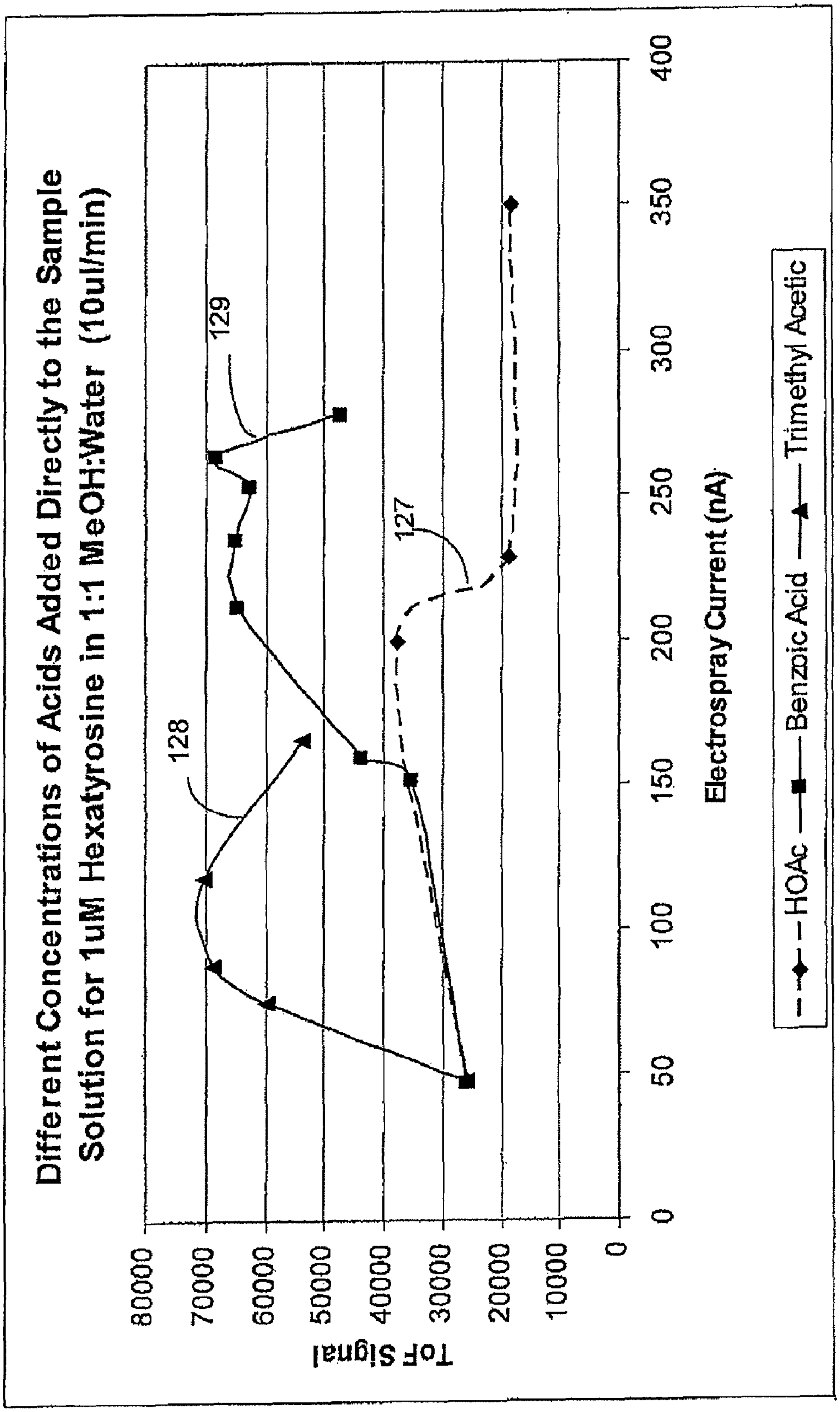

FIG. 12 shows a set of ESMS signal curves comparing positive polarity ESMS ion signal of a 1 μM reserpine in 1:1 methanol:water solution running at a flow rate of 10 μl/min for acetic acid, benzoic acid and trimethyl acetic acids added individually to the sample solution at different concentrations.

Figure 13:
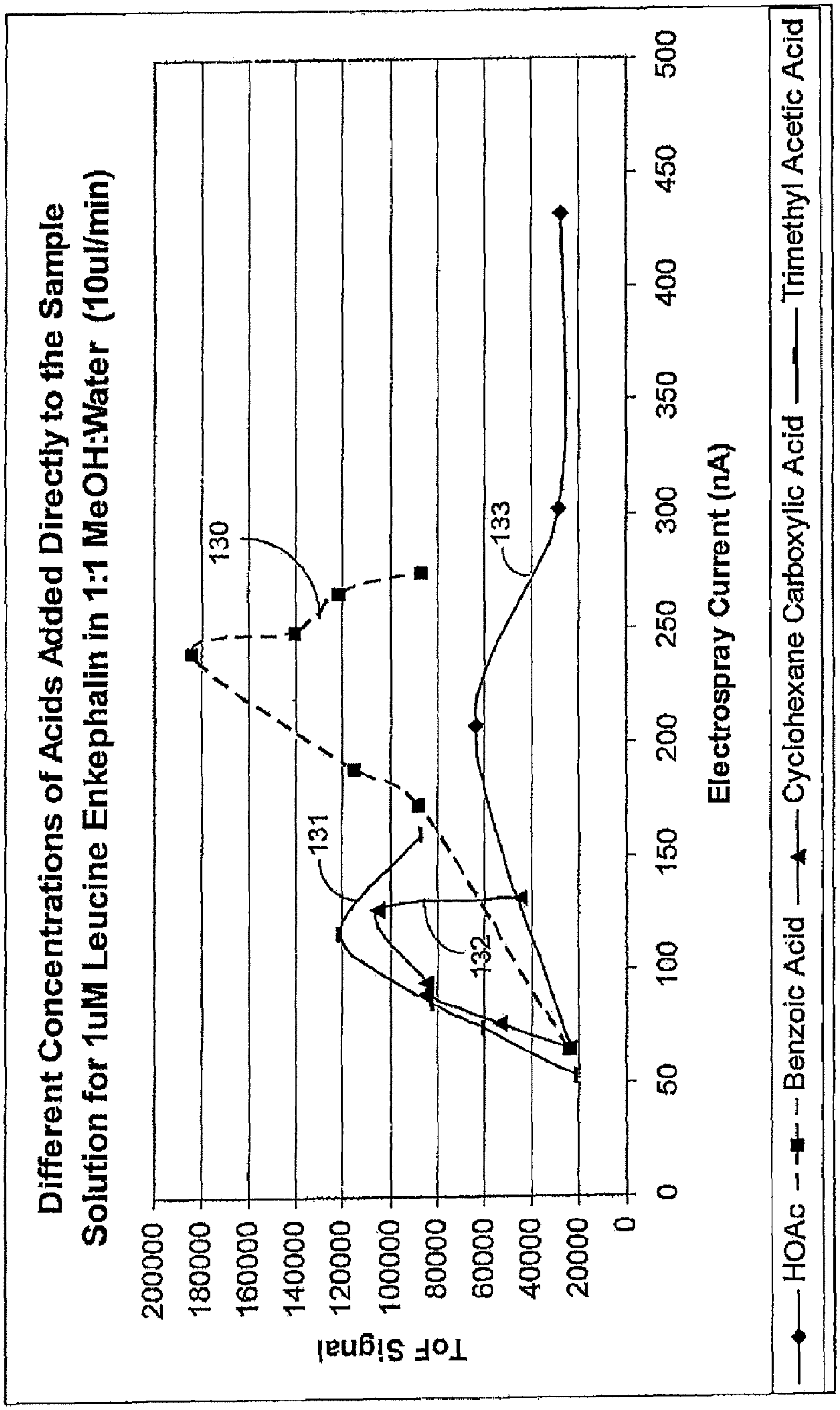

FIG. 13 shows a set of ESMS signal curves comparing positive polarity of ESMS ion signal of a 1 μM leucine enkephalin in a 1:1 methanol:water solution running at a flow rate of 10 μl/min for acetic acid, benzoic acid, cyclohexanecarboxylic acid and trimethyl acetic acids added individually to the sample solution at different concentrations.

Figure 14A:
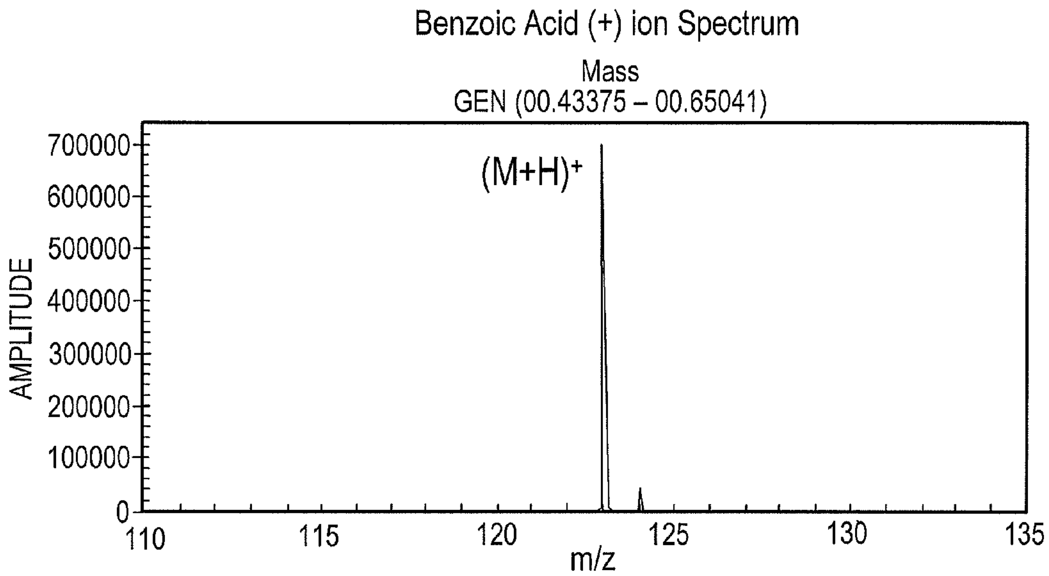
Figure 14B:
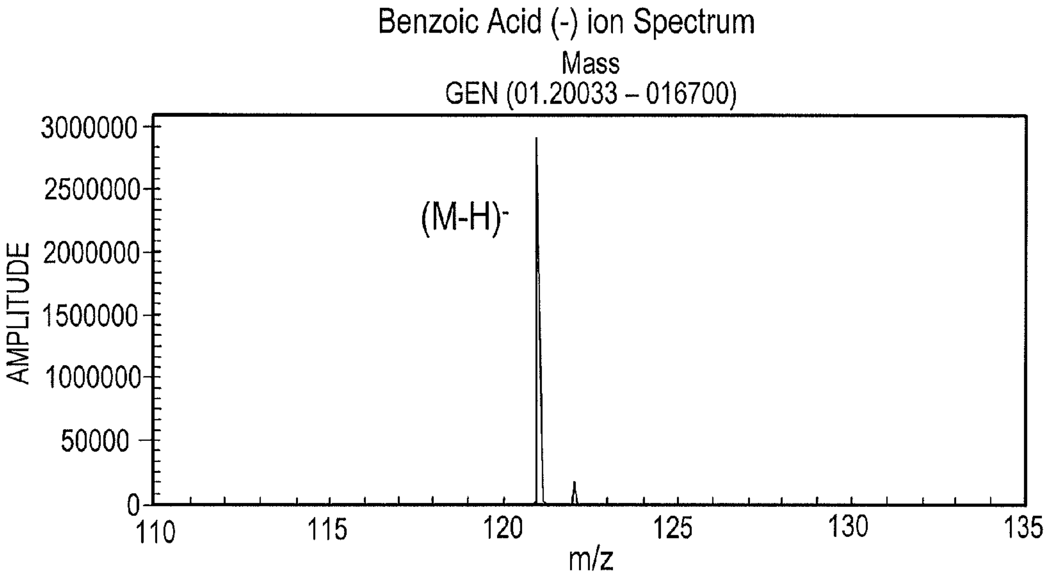

FIG. 14A is a positive polarity electrospray mass spectrum of benzoic acid and FIG. 14B is a negative polarity mass spectrum of benzoic acid.

Figure 15A:
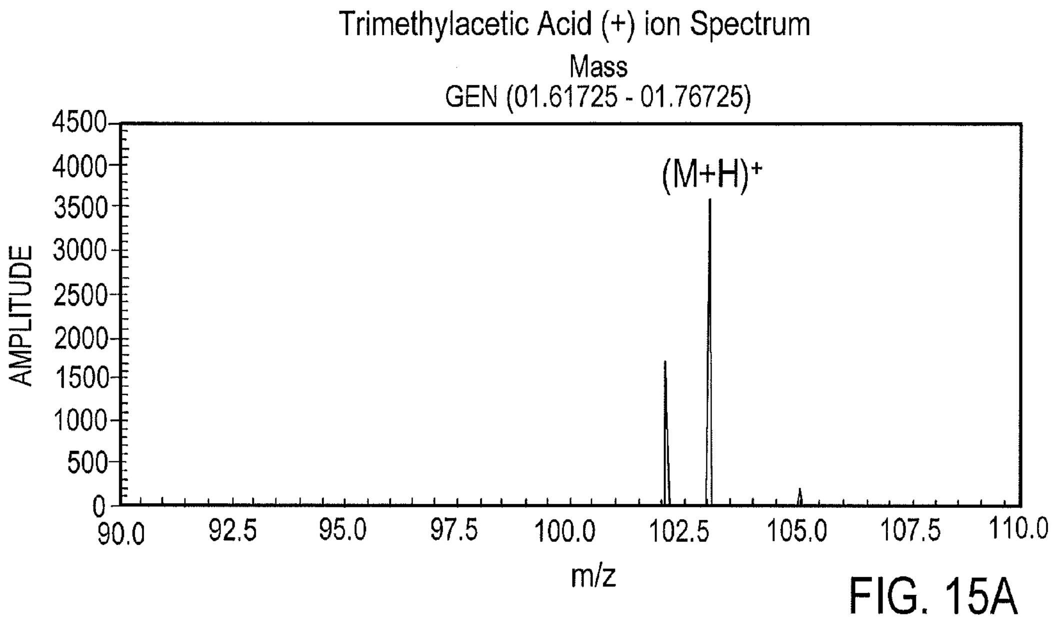
Figure 15B:
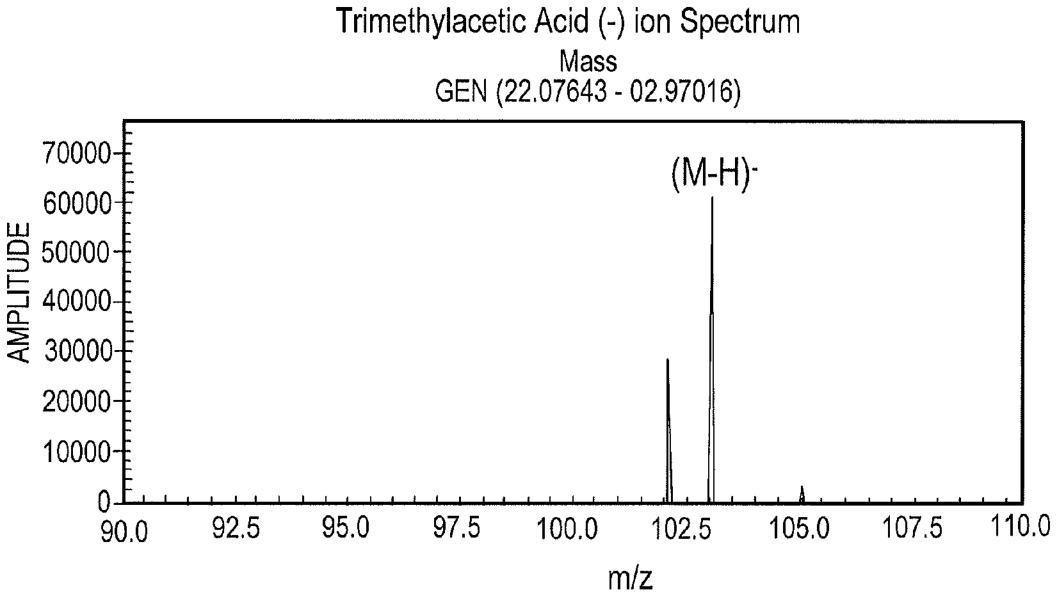

FIG. 15A is a positive polarity electrospray mass spectrum of trimethyl acetic acid and FIG. 15B is a negative polarity mass spectrum of trimethyl acetic acid.

Figure 16A:
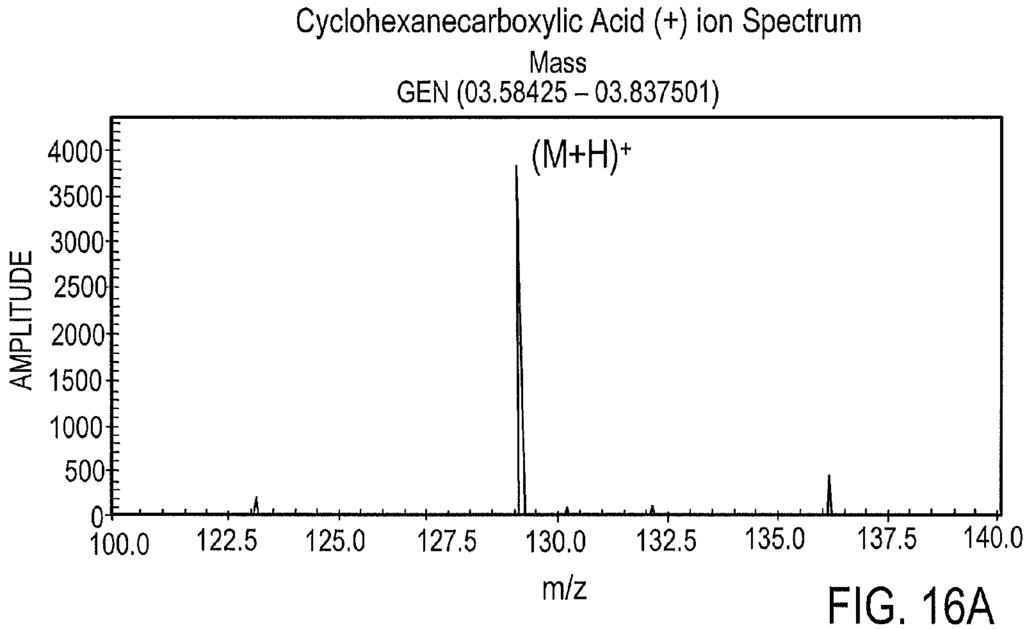
Figure 16B:
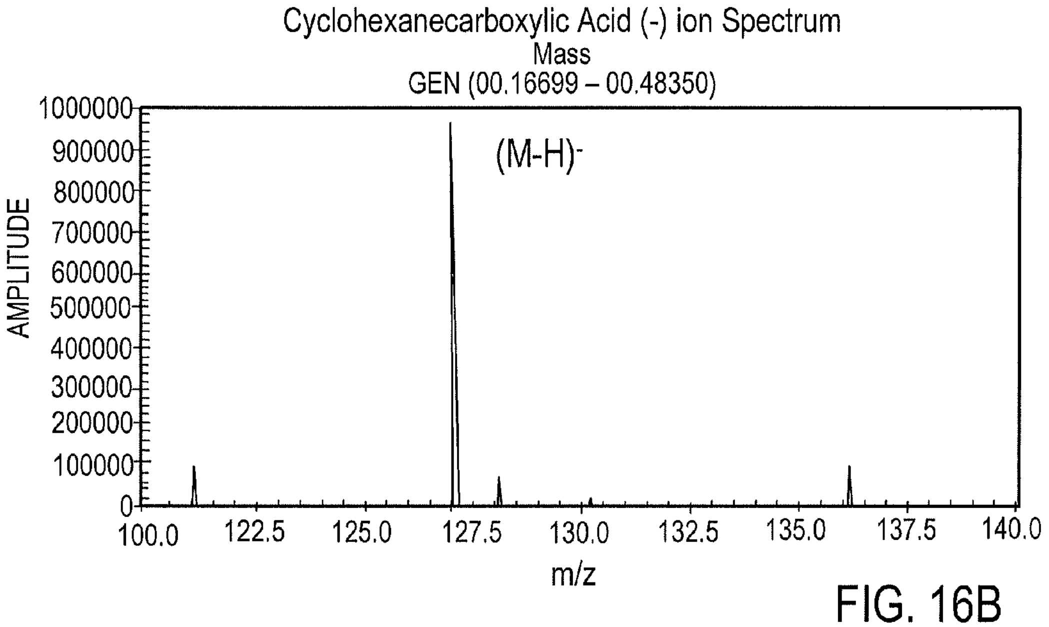

FIG. 16A is a positive polarity electrospray mass spectrum of cyclohexanecarboxylic acid and FIG. 16B is a negative polarity mass spectrum of cyclohexanecarboxylic acid.

Figure 17:
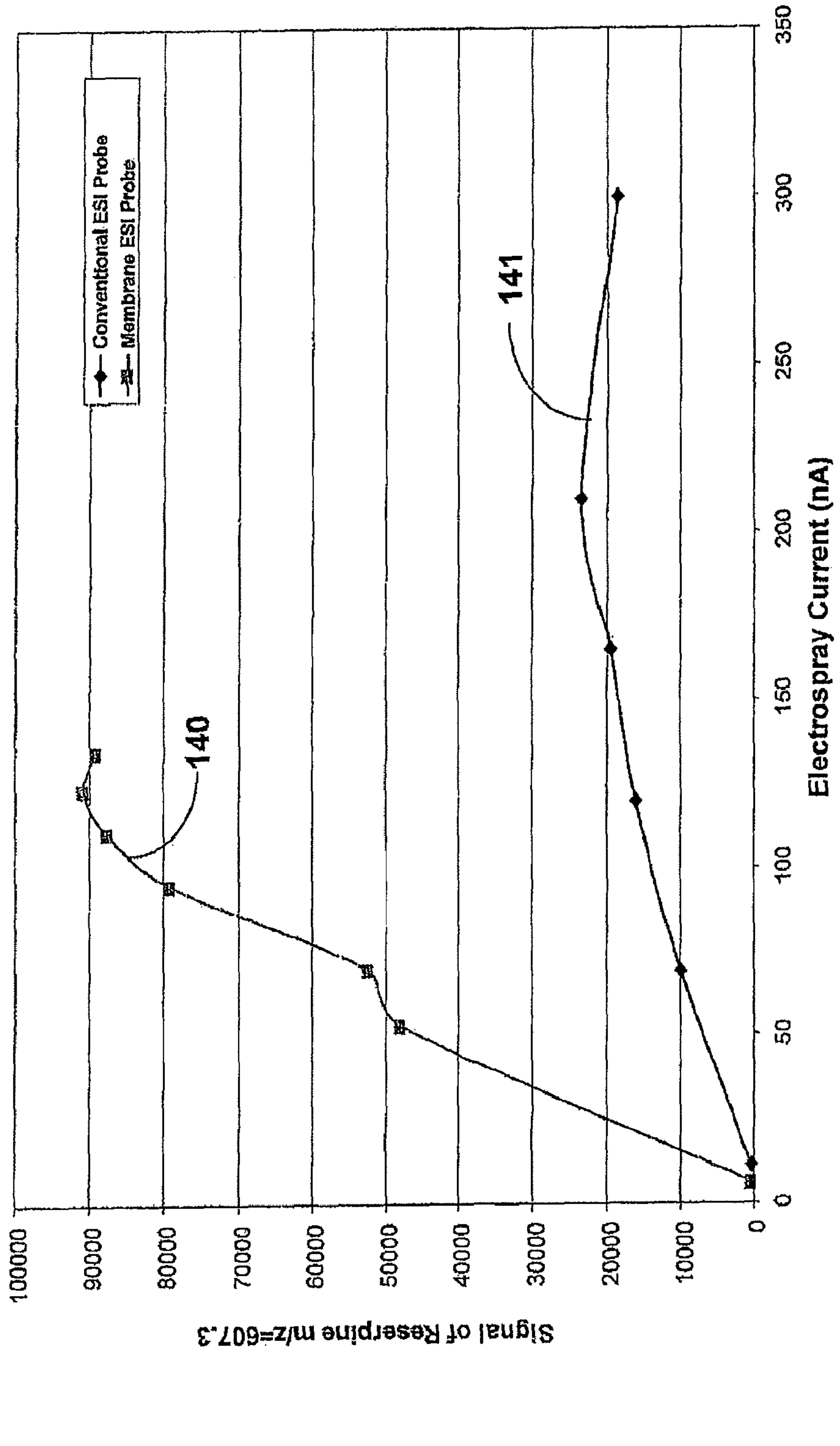

FIG. 17 shows a set of ESMS signal curves comparing negative polarity ion signal of reserpine run in a sample solution with ammonium hydroxide added directly to the sample solution and to the second solution of an electrospray membrane probe.

Figure 18:
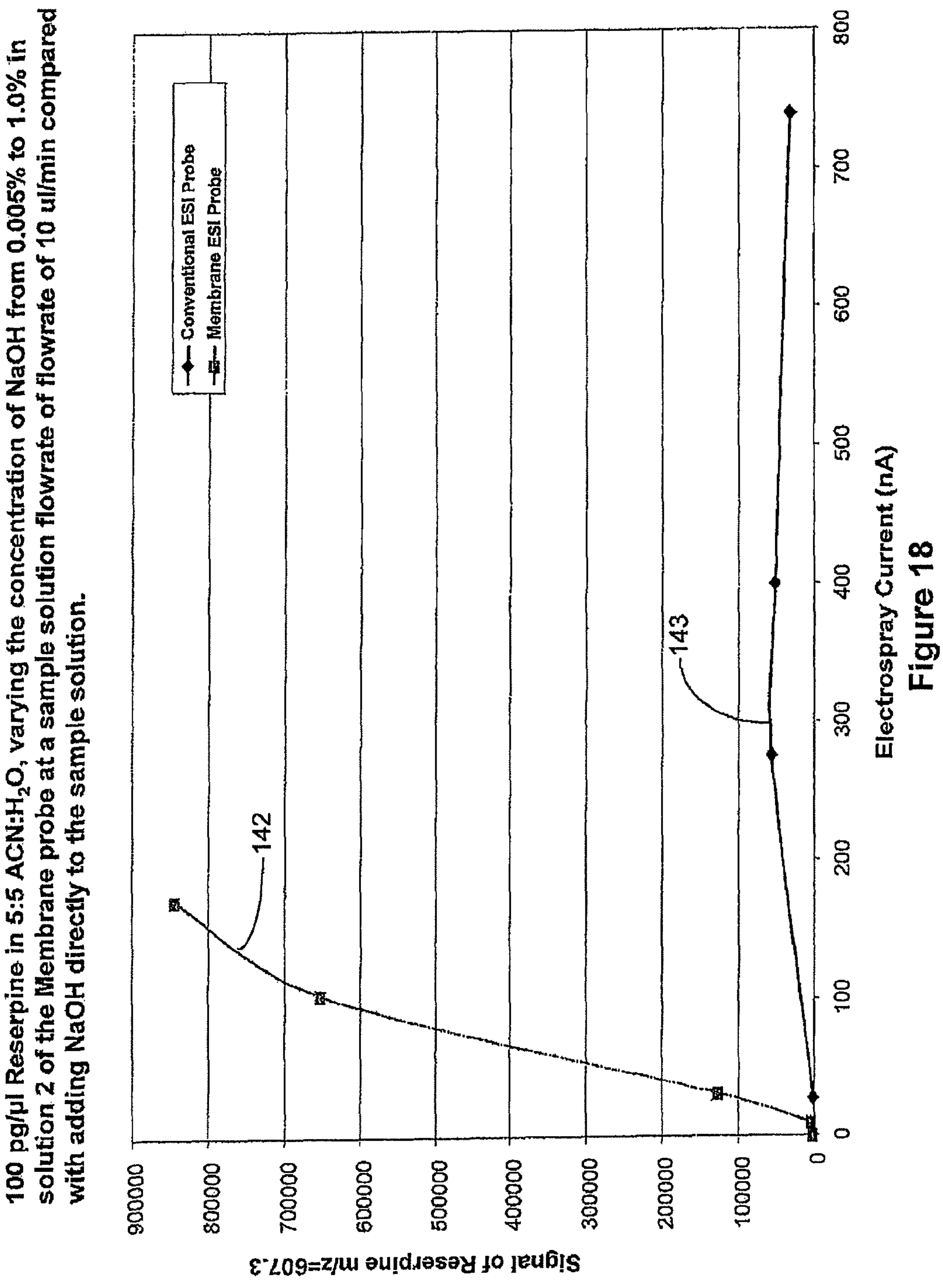

FIG. 18 shows a set of ESMS signal curves comparing negative polarity ion signal of reserpine run in a sample solution with sodium hydroxide added directly to the sample solution and to the second solution of an electrospray membrane probe.

DESCRIPTION OF THE INVENTION

Electrospray total ion current, for a given applied electric field, is a function of the sample solution conductivity between the electrospray tip and the first electrically conductive surface in the sample solution flow path. The primary charge carrier in positive ion electrospray is generally the H+ ion which is produced from redox reactions occurring at electrode surfaces in contact with the sample solution in conventional electrospray or a second solution in electrospray membrane probe. The electrolyte added to the sample or second solution plays a direct or indirect role in adding or removing H+ ions in solution during electrospray ionization. The indirect role in producing H+ ions is the case where the electrolyte aids in the electrolysis of water at the electrode surface to produce H+ ions. The direct role an electrolyte can play is to supply the H+ ion directly from dissociation of an acid and loss of an electron at the electrode surface. The type and concentration of the electrolyte anion or neutral molecule in positive ion polarity and even negative ion polarity significantly affects the electrospray ionization efficiency of analyte species. The mechanism or mechanisms through which the electrolyte operates to affect ion production in electrospray ionization is not well understood. Even the role an electrolyte plays in the redox reactions that occur during electrospray charged droplet formation is not well characterized. Consequently, the type and concentration of the electrolyte species used in electrospray ionization is determined largely through trial and error with decisions based on empirical evidence for a given electrospray MS analytical application. To this end, a number of electrolyte species were screened using an electrospray membrane probe to determine if electrolyte species different from those used conventionally or historically provided improved electrospray performance. Conventional electrolytes were also screened to determine if improved analyte ESMS signal could be achieved using an electrospray membrane probe and adding the electrolyte to the ES membrane probe second solution compared with adding the conventional electrolyte directly to the sample solution in electrospray ionization. A set of such new electrolytes was found which demonstrated improved analyte ESMS signal in both positive and negative positive modes. The set of new electrolytes comprises but may not be limited benzoic acid, trimethylacetic acid and cyclohexanecaboxylic acid. In addition, a set of more conventional electrolytes was found that, when run in the second solution of the electrospray membrane probe increased the analyte ion signal compared to the ESMS signal achieved when the same electrolyte was added directly to the sample solution. The set of conventional electrolytes that enhanced analyte negative polarity ion ESMS signal when run in the second solution of the electrospray membrane probe include but are not limited to ammonium hydroxide and sodium hydroxide.

Unlike electrolytes conventionally or historically used in electrospray ionization, when electrospraying with a new electrolyte, a characteristic electrolyte ion peak is generated in both positive and negative ion polarity mode. The $(M+H)^+$ ion is generated for benzoic acid, trimethyl acetic acid and cyclohexanecarboxylic acid in positive polarity electrospray ionization. Conversely, the $(M-H)^-$ ion, as expected, is generated when electrospraying benzoic acid, trimethyl acetic acid and cyclohexanecarboxylic acid in negative polarity as shown in FIGS. 14, 15 and 16. The mechanism or mechanisms by which the new electrolyte enhances the electrospray signal may occur in the liquid phase, gas phase or both. Benzoic acid has a low gas phase proton affinity so protonated benzoic acid ion may readily donate an H+ to gas phase neutral analyte species or may reduce the neutralization of the Electrospray produced analyte ion by transferring protons to competing higher proton affinity contamination species in the gas phase.

Figure 1:
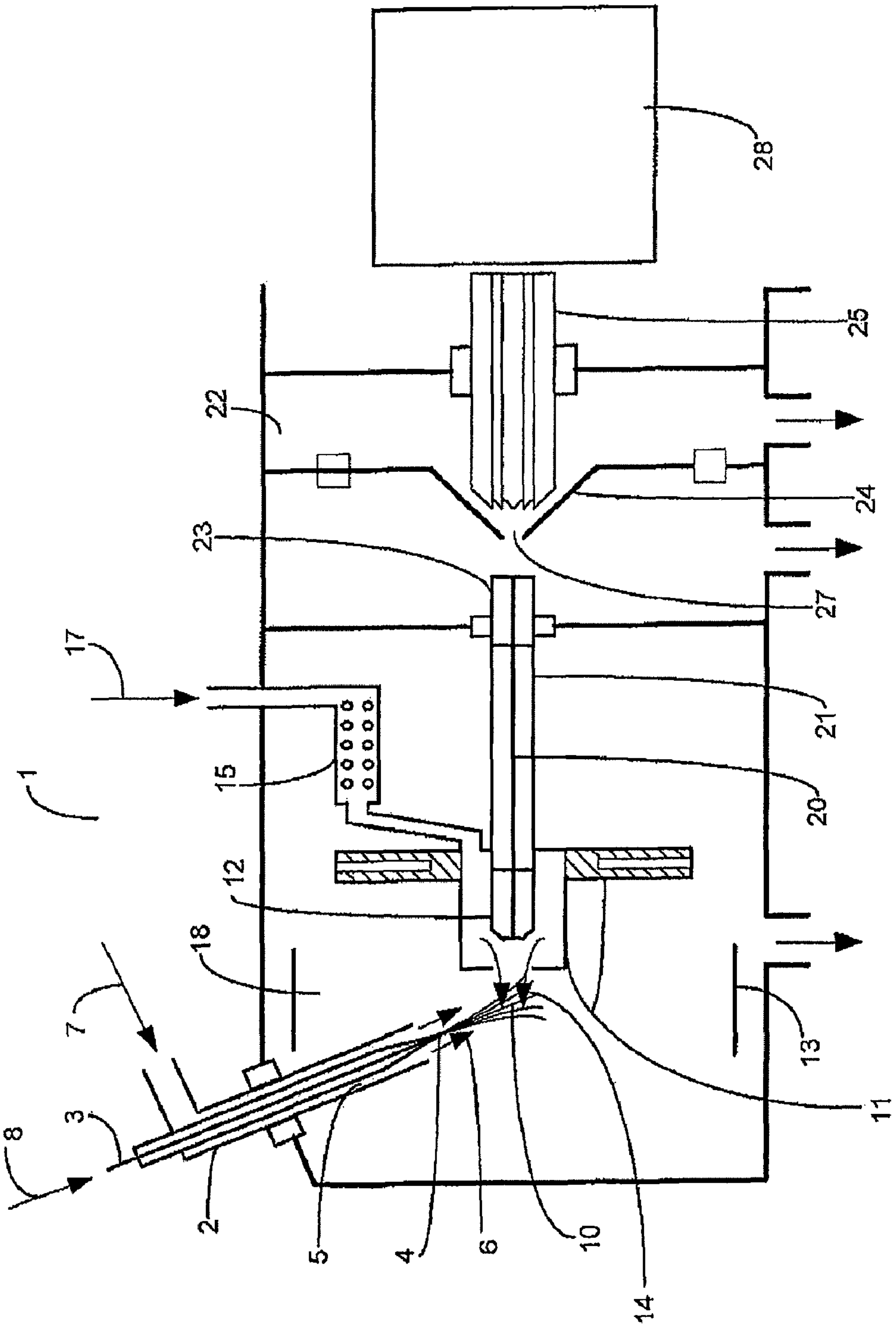
FIG. 1 is a schematic of an electrospray ion source interfaced to a mass spectrometer.

A cross section schematic of electrospray ion source 1 is shown in FIG. 1. Electrospray sample solution inlet probe 2 comprises sample solution flow channel or tube 3, electrospray tip 4 and annulus 5 through which pneumatic nebulization gas 7 flows exiting concentrically 6 around electrospray tip 4. Different voltages are applied to endplate and nosepiece electrode 11, capillary entrance electrode 12 and cylindrical lens 13 to generate single polarity charged droplets in electrospray plume 10. Typically, in positive polarity electrospray ionization, electrospray tip 4 would be operated at ground potential with −3 KV, −5 KV and −6 KV applied to cylindrical lens 13, nosepiece and endplate electrode 11 and capillary entrance electrode 12 respectively. Gas heater 15 heats countercurrent drying gas flow 17. Charged droplets comprising charged droplet plume 10 produced by unassisted Electrospray or electrospray with pneumatic nebulization assist evaporate as they pass through electrospray source chamber 18. Heated countercurrent drying gas 14 exiting through the orifice in nosepiece electrode 11 aids in the drying of charged liquid droplets comprising electrospray plume 10. A portion of the ions generated from the rapidly evaporating charged liquid droplets are directed by electric fields to pass into and through orifice 20 of dielectric capillary 21 into vacuum. Ions exiting capillary orifice 20 are directed through skimmer orifice 27 by the expanding neutral gas flow and the relative voltages applied to capillary exit lens 23 and skimmer electrode 24. Ions exiting skimmer orifice 27 pass through ion guide 25 and into mass to charge analyzer 28 where they are mass to charge analyzed and detected as is known in the art.

The analyte ion signal measured in the mass spectrometer is due in large part to efficiency of electrospray ionization for a given analyte species. The electrospray ionization efficiency includes the processes that convert neutral molecules to ions in the atmospheric pressure ion source and the efficiency by which the ions generated at atmospheric pressure are transferred into vacuum. The new electrolyte species may play a role in both mechanisms that affect electrospray ionization efficiency. In one embodiment of the invention, at least one of the new electrolytes including, benzoic acid, trimethyl acetic acid and cyclohexanecarboxylic acid is added to sample solution 8 delivered through sample solution flow channel 3 to electrospray tip 4 where the sample solution is electrosprayed into electrospray ion source chamber 18.

Figure 2:
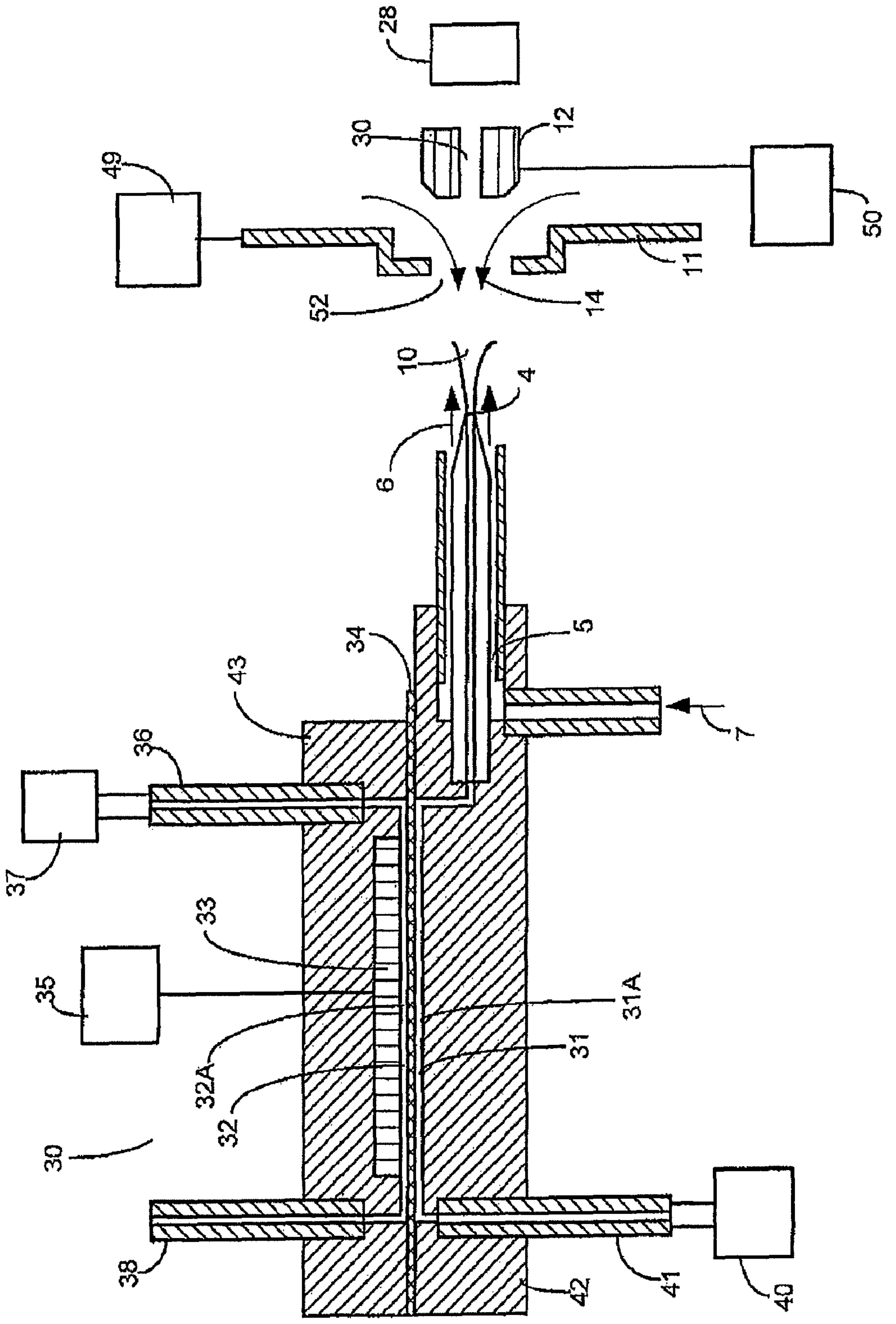
FIG. 2 is a cross section diagram of an electrospray membrane probe.

FIG. 2 shows the cross section diagram of an electrospray membrane probe 30 that is used in an alternative embodiment of the invention, electrospray membrane probe 30, more fully described in U.S. patent application Ser. No. 11/132,953 and incorporated herein by reference, comprises sample solution flow channel 31A through which sample solution flow 31 flows exiting at electrospray tip 4. Common elements with FIG. 1 retain the element numbers. A second solution 32, in contact with electrode 33, passes through second solution flow path 32A. Voltage is applied to electrode 33 from power supply 35. Sample solution 31 and second solution 32 are separated by semipermeable membrane 34. Semipermeable membrane 34 may comprise a cation or anion exchange membrane. A typical cation exchange membrane is Naflon™ that may be configured with different thicknesses and/or conductivity characteristics in electrospray membrane probe assembly 30. Second solution 32 flow is delivered into second solution flow channel 32A from an isocratic or gradient fluid delivery system 37 through flow channel 36 and exits through channel 38. Sample solution 31 flow is delivered to sample solution flow channel 31A from isocratic or gradient fluid delivery system 40 through flow channel 41. Dielectric probe body sections 42 and 43 comprise chemically inert materials that do not chemically react with sample solution 31 and second solution 32. Sample solution 31 passing through flow channel 31A is electrosprayed from electrospray tip 4 with or without pneumatic nebulization assist forming electrospray plume 10. Electrospray with pneumatic nebulization assist is achieved by flowing nebulization gas 7 through annulus 5 exiting at 6 concentrically around electrospray tip 4. To effect the electrospray generation of single polarity charged liquid droplets, relative voltages are applied to second solution electrode 33, nosepiece and end plate electrode 11 and capillary entrance electrode 12 using power supplies 35, 49 and 50 respectively. Heated counter current drying gas 14 aids in drying charged liquid droplets in spray plume 10 as they move towards capillary orifice 20 driven by the applied electric fields. A portion of the ions produced from the rapidly evaporating droplets in electrospray plume 10 pass through capillary orifice 20 and into mass to charge analyzer 28 where they are mass to charge analyzed and detected.

Figure 3:
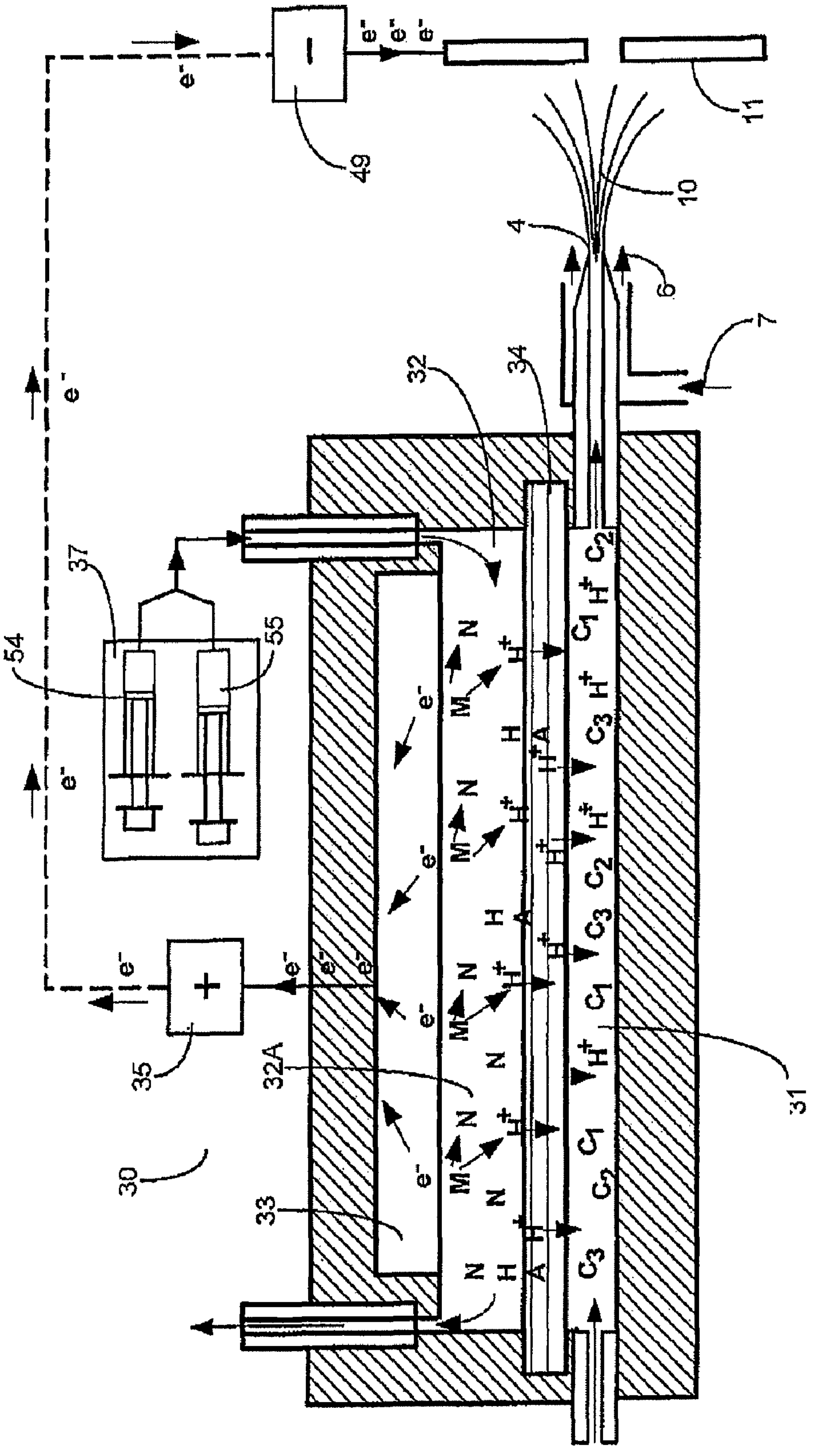
FIG. 3 is a zoomed in view of the sample solution flow channel, the second solution flow channel and the semipermeable membrane in an electrospray membrane probe.

FIG. 3 is a diagram of one electrospray membrane probe 30 operating mode for positive polarity electrospray ionization employing an alternative embodiment of the invention. At least one new electrolyte species comprising benzoic acid, trimethyl acetic acid and cyclohexanecarboxylic acid is added in higher concentration to the solution contained in syringe 54 of fluid delivery system 37. Syringe 55 is filled with the same solvent composition as loaded into syringe 54 but without a new electrolyte species added. A specific isocratic new electrolyte concentration or a new electrolyte concentration gradient for second solution 32 can be delivered to second solution flow channel 32A by setting the appropriate ratios of pumping speeds on syringes 54 and 55 in fluid delivery system 37. During positive ion polarity electrospray ionization, H+ is produced at the surface of second solution electrode 33 and passes through semipermeable membrane 34, most likely as $H_3O^+$, into sample solution 31 driven by the electric field. A portion of the new electrolyte species flowing through second solution flow channel 32A also passes through semipermeable membrane 34 entering sample solution 31 and forming a net concentration of new electrolyte in sample solution 31. The new electrolyte concentration in solution 31 during electrospray operation is well below the new electrolyte concentration in second solution 32. The electrospray total ion current and consequently the local sample solution pH at electrospray tip 4, the new electrolyte concentration in sample solution 31 and the sample ion electrospray MS signal response can be controlled by adjusting the new electrolyte concentration in second solution 32 flowing through second solution flow channel 32A. The solvent composition of second solution 32 can be configured to be different from the solvent composition of the sample solution to optimize solubility and performance of a new electrolyte species.

Figure 4B:
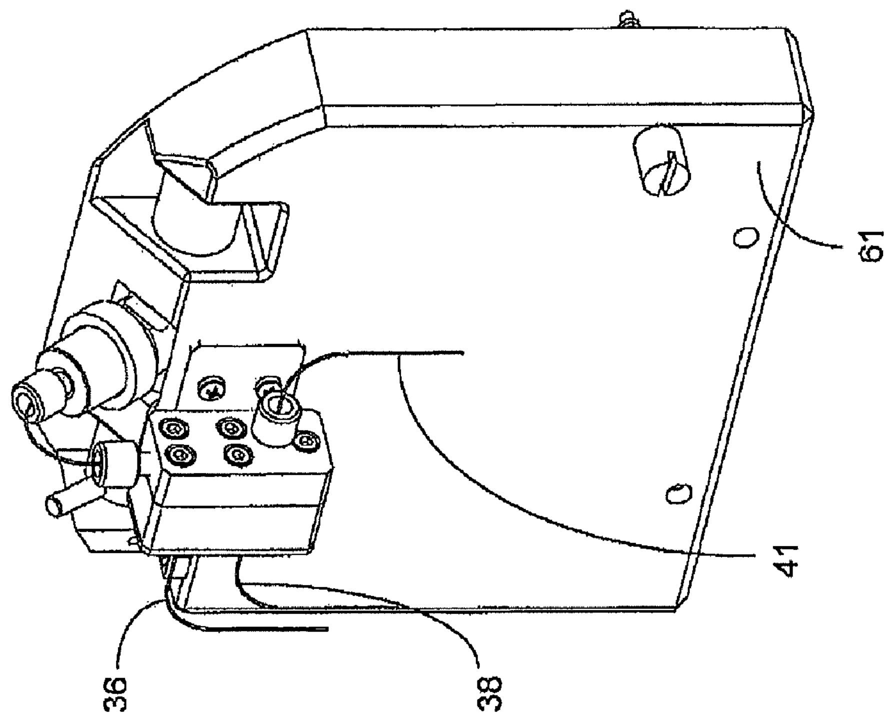
FIG. 4 shows a single section electrospray membrane probe integrated with pneumatic nebulization sprayer mounted on an electrospray ion source probe mounting plate.
Figure 4A:
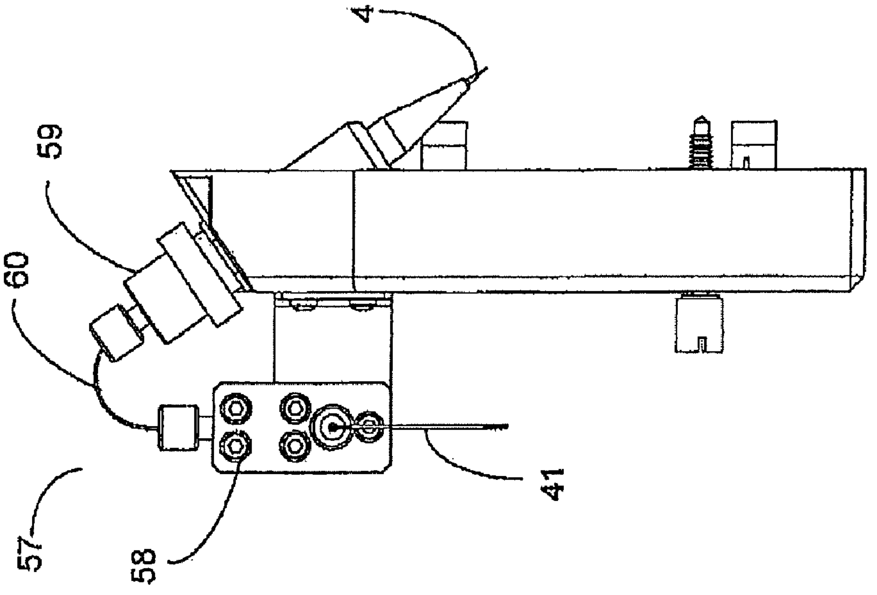

FIG. 4 shows one embodiment of electrospray membrane probe 57 comprising single membrane section assembly 58 connected to pneumatic nebulization electrospray inlet probe assembly 59 mounted on electrospray ion source probe plate 61. Common elements diagrammed in FIGS. 1, 2 and 3 retain the same element numbers.

Figure 5:
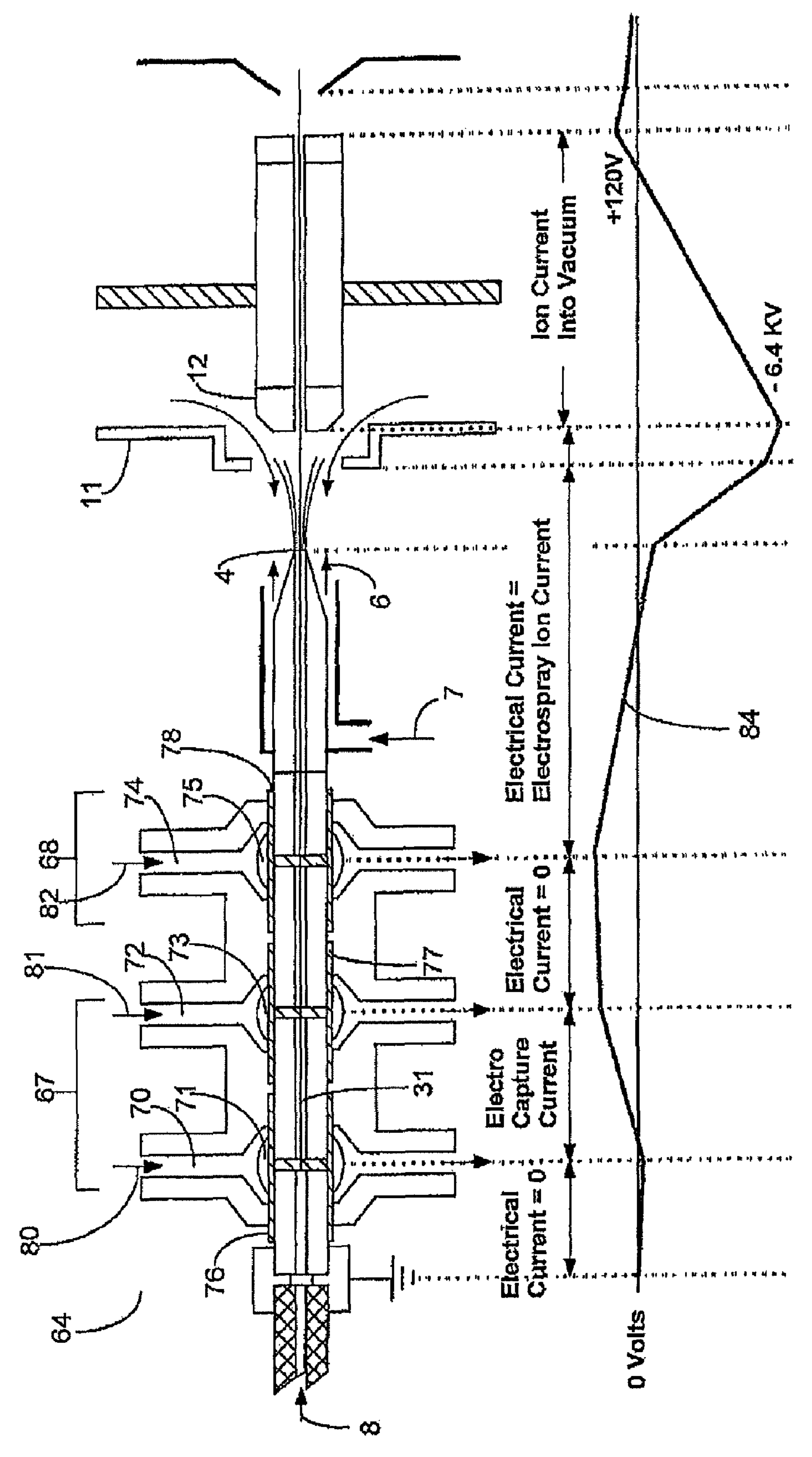
FIG. 5 is a schematic of a three section electrospray membrane probe.

FIG. 5 is a diagram of three membrane section electrospray membrane probe assembly 64 comprising electrocapture dual membrane section 67 and single electrospray membrane section 68. Each membrane section operates in a manner similar to the single section electrospray membrane probe described in FIGS. 2 and 3. Electro capture dual membrane section 67 comprises second solution flow channel 70 with electrode 71 and semipermeable membrane section 76 and second solution flow channel 72 with electrode 73 and semipermeable membrane section 77. Single membrane section 68 comprises second solution flow channel 74 and electrode 75 with semipermeable membrane 78. The electrolyte type and concentration and solution composition can be controlled in second solutions 80, 81 and 82 as described previously. Common elements described in FIGS. 1 through 4 retain their element numbers in FIG. 5. Electrical potential curve 84 is a diagram of one example of relative electrical potentials set along the sample solution flow path for positive polarity electrospray ionization and positive ion electrocapture. Dual membrane electrocapture section 67 can be operated to trap and release positive or negative polarity sample ions in the sample solution as described in pending PCT Patent Application Number PCT/SE2005/001844 incorporated herein by reference. In an alternative embodiment of the invention, at least one new electrolyte including benzoic acid, trimethyl acetic acid or cyclohexanecarboxylic acid species is added to second solution 82 with the concentration controlled to maximize electrospray sample ion signal as described above. Second solution 82 composition and flow rate can be varied and controlled independently from second solutions 80 and 81 compositions and flow rates to independently optimize electrocapture and on line electrospray performance.

Figure 6:
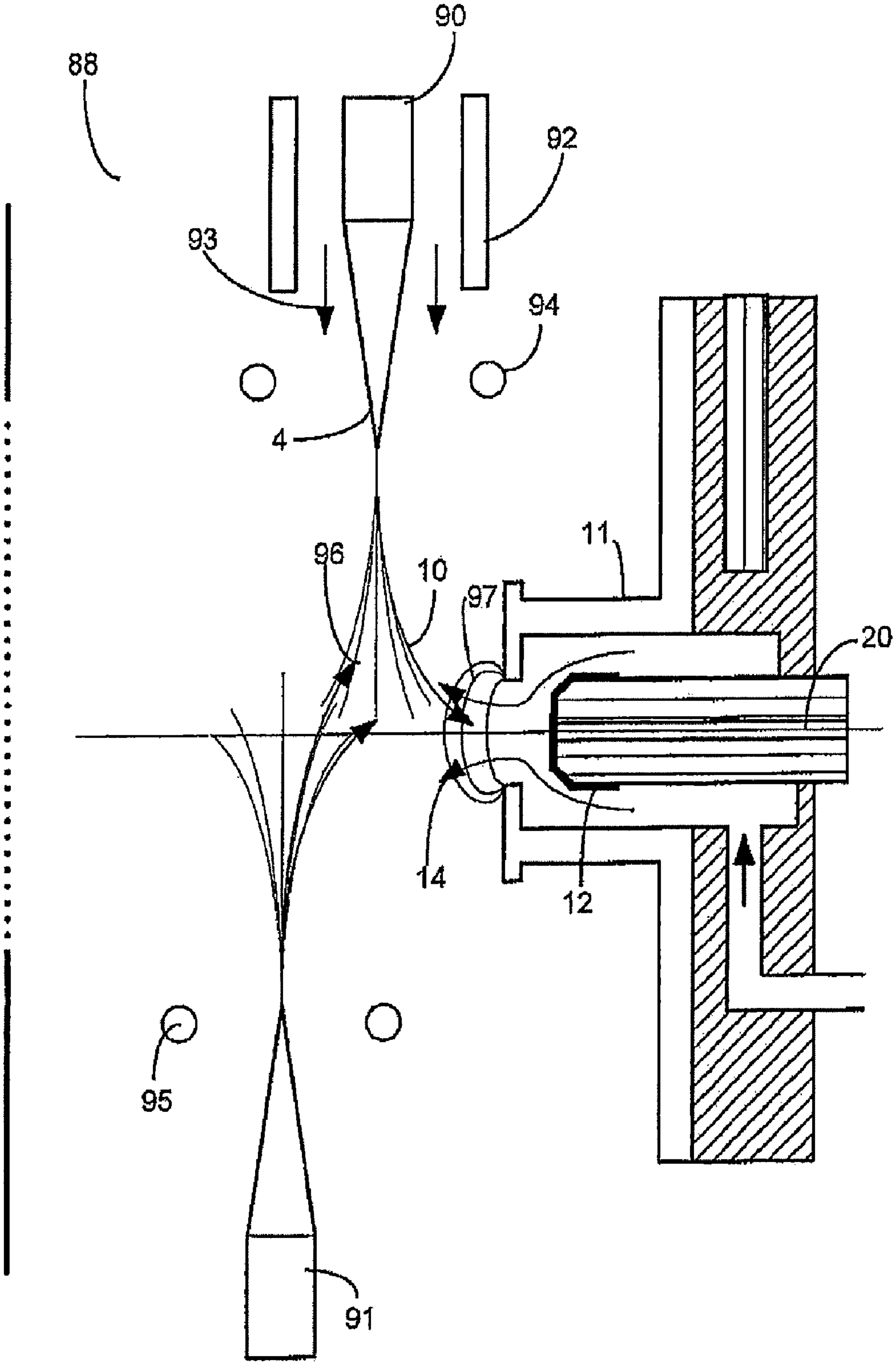
FIG. 6 is a diagram of a combination atmospheric pressure ion source comprising a sample solution electrospray inlet probe and an electrospray reagent ion source.

FIG. 6 is a diagram of atmospheric pressure combination ion source 88 comprising electrospray inlet probe assemblies 90 and 91 with pneumatic nebulization assist. Electrospray inlet probe 90 comprises electrospray tip 4 and auxiliary gas heater 92 heating gas flow 93 to aid in the drying of charged liquid droplets comprising electrospray plume 10. Voltage applied to ring electrodes 94 and 95 allow control of the production of net neutral or single polarity charged liquid droplets from electrospray inlet probes 90 and 91 respectively while minimizing undesired electric fields in spray mixing region 96. Electrospray inlet probe 91 provides a source of reagent ions that when drawn through spray plume 10 by electric fields 97 effect atmospheric chemical ionization of a portion of the vaporized neutral sample molecules produced from evaporating charged droplets in spray plume 10. Combination ion source 88 can be operated in electrospray only mode, APCI only mode or a combination of electrospray and APCI modes as described in pending U.S. patent application Ser. No. 11/396,968 incorporated herein by reference. In an alternative embodiment of the invention, at least one new electrolyte, including benzoic acid, trimethyl acetic acid or cyclohexanecarboxylic acid, can be added to the sample flow solution of electrospray inlet probe 90 and/or to the reagent solution of electrospray inlet probe 91 which produces reagent ions to promote gas phase atmospheric pressure chemical ionization in mixing region 96. New electrolyte species run in sample solutions can increase the sample ESMS ion single as described above. In addition, new electrolytes in the reagent solution electrosprayed from electrospray probe 91 form low proton affinity protonated ions in positive ion polarity electrospray which serve as reagent ions for charge exchange in atmospheric pressure chemical ionization or combination ES and APCI operation. New electrolyte species may also be added to sample solution in corona discharge reagent ion sources or APCI sources to improve APCI source performance.

Figure 7:
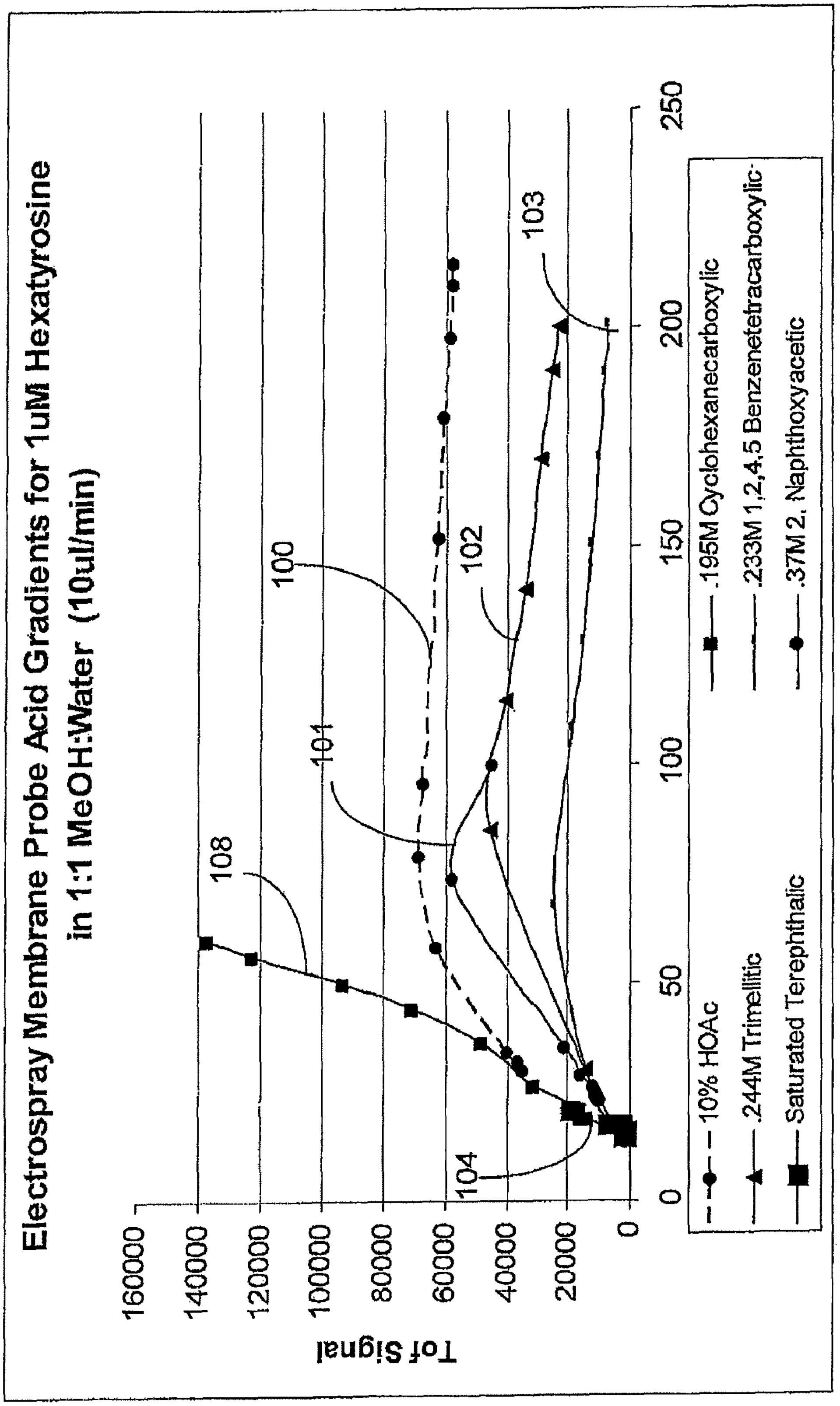
FIG. 7 shows the ESMS ion signal curves for a 1 μM hexatyrosine in a 1:1 methanol: water solution electrosprayed at a flow rate of 10 μl/min while running electrolyte concentration gradients in the electrospray membrane probe second solution flow using conventional electrolyte species and a new electrolyte species.

FIG. 7 shows a set of ESMS ion signal curves for 1 μM hexatyrosine sample in a 1:1 methanol:water sample solutions electrosprayed using an electrospray membrane probe configuration 30 as diagrammed in FIGS. 1, 2 and 3. All sample solutions were run at a flow rate of 10 μl/min. Concentration gradients of different electrolyte species were run in the second solution flow channel while acquiring electrospray mass spectrum, The second solution solvent composition was methanol:water for all electrolytes run with the exception of naphthoxyacetic acid which was run in a methanol second solution. As the concentration of the added electrolyte increased in the second solution flow, the electrospray total ion current increased. Each curve shown in FIG. 7 is effectively a base ion chromatogram with the hexatyrosine peak amplitude plotted over electrospray total ion current.

Signal response curves 100, 101, 102, 103 and 104 for hexatyrosine versus electrospray total ion current were acquired when running second solution concentration gradients of acetic acid (up to 10%), 2 napthoxyacetic acid (up to 0.37M), trimellitic acid (up to 0.244 M), 1,2,4,5 benzene carboxylic acid (up to 0.233 M) and terephthalic acid (saturated) respectively. Conventional electrolyte, acetic acid, provided the highest hexatyrosine ESMS signal amplitude for this set of electrolytes as shown in FIG. 6. Hexatyrosine signal response curve 108 was acquired while running a concentration gradient in the second solution of new electrolyte cyclohexanecarboxylic acid (up to 0.195 M). The maximum hexatyrosine signal achieved with new electrolyte run in the second solution of electrospray membrane probe 30 was two times the maximum amplitude achieved with acetic acid as an electrolyte. The limited cross section area of the semipermeable membrane in contact with the sample solution limited the electrospray total ion current range with new electrolyte cyclohexanecarboxylic acid run in the second solution. As will be shown in later figures, higher analyte signal can be achieved by adding new electrolyte species directly to the sample solution. The difference in the shape and amplitude of curve 108 illustrates the clear difference in performance of the electrospray ionization process when new electrolyte cyclohexanecarboxylic acid is used.

Figure 8:
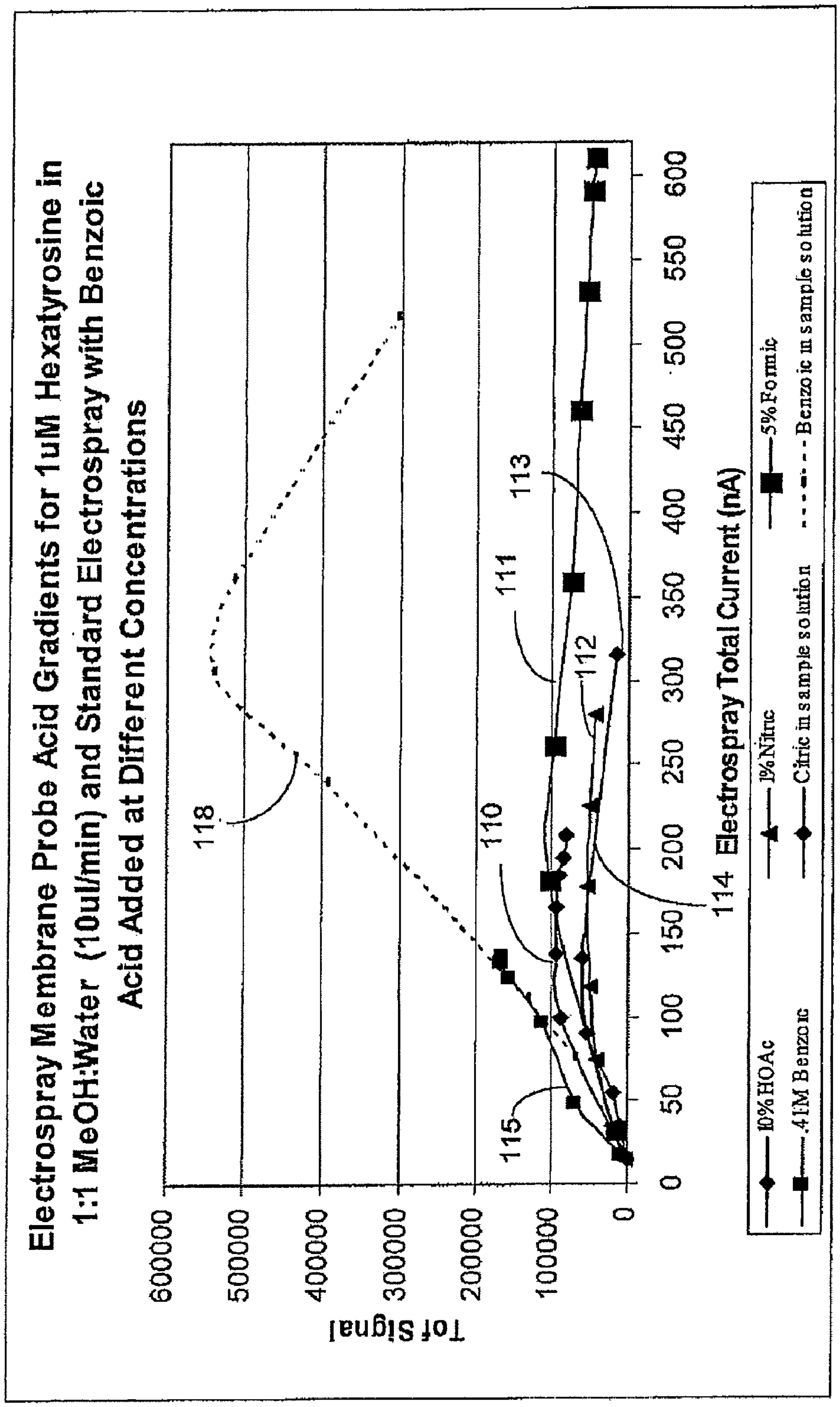
FIG. 8 shows the ESMS signal curves for a 1 μM hexatyrosine in a 1:1 methanol: water solution electrosprayed at a flow rate of 10 μl/min while running conventional and new electrolyte species concentration gradients in the electrospray membrane probe second solution flow and with benzoic acid added directly to the sample solution at different concentrations.

FIG. 8 shows another set of ESMS ion signal curves for 1 μM hexatyrosine sample in a 1:1 methanol:water sample solutions electrosprayed using an electrospray membrane probe configuration 30 as diagrammed In FIGS. 1, 2 and 3. Hexatyrosine electrospray MS signal response curves 110 through 112 and 115 were acquired while running electrolyte concentration gradients in the second solution flow of electrospray membrane probe 30. Hexatyrosine electrospray MS signal response curve 118 was acquired by electrospraying different sample solutions having different new electrolyte benzoic acid concentrations added directly to the sample solution. ESMS signal response curve 114 with end data point 113 for hexatyrosine was acquired by electrospraying different sample solutions comprising different concentrations of citric acid added directly to the sample solutions. No electrospray membrane probe was used to generate curves 114 or 118. Signal response curves 110, 111, 112 and 115 for hexatyrosine versus electrospray total ion current were acquired when running second solution concentration gradients of conventional electrolytes, acetic acid (up to 10% in the second solution), formic acid (up to 5%) and nitric acid (up to 1%) and new electrolyte benzoic acid (up to 0.41M in the second solution) respectively. Comparing the hexatyrosine ESMS signal response with new electrolyte benzoic acid added to the second solution of membrane probe 30 or directly to the sample solution during electrospray ionization, similar ion signals are obtained for the same electrospray ion current generated. Electrospray performance with the electrolyte added to the electrospray membrane probe second solution generally correlates well with the electrospray performance with the same electrolyte added directly to the sample solution during electrospray ionization for similar electrospray total ion currents. As shown by curves 115 and 118, increased hexatyrosine ESMS signal is achieved when new electrolyte benzoic acid is added to the second solution of electrospray membrane probe 30 or directly to the sample solution during electrospray ionization. The maximum hexatyrosine ESMS signal shown by signal response curve 118 was over five times higher than that achieved with any of the conventional electrolytes acetic, formic or nitric acids or non conventional electrolyte citric acid.

Figure 9:
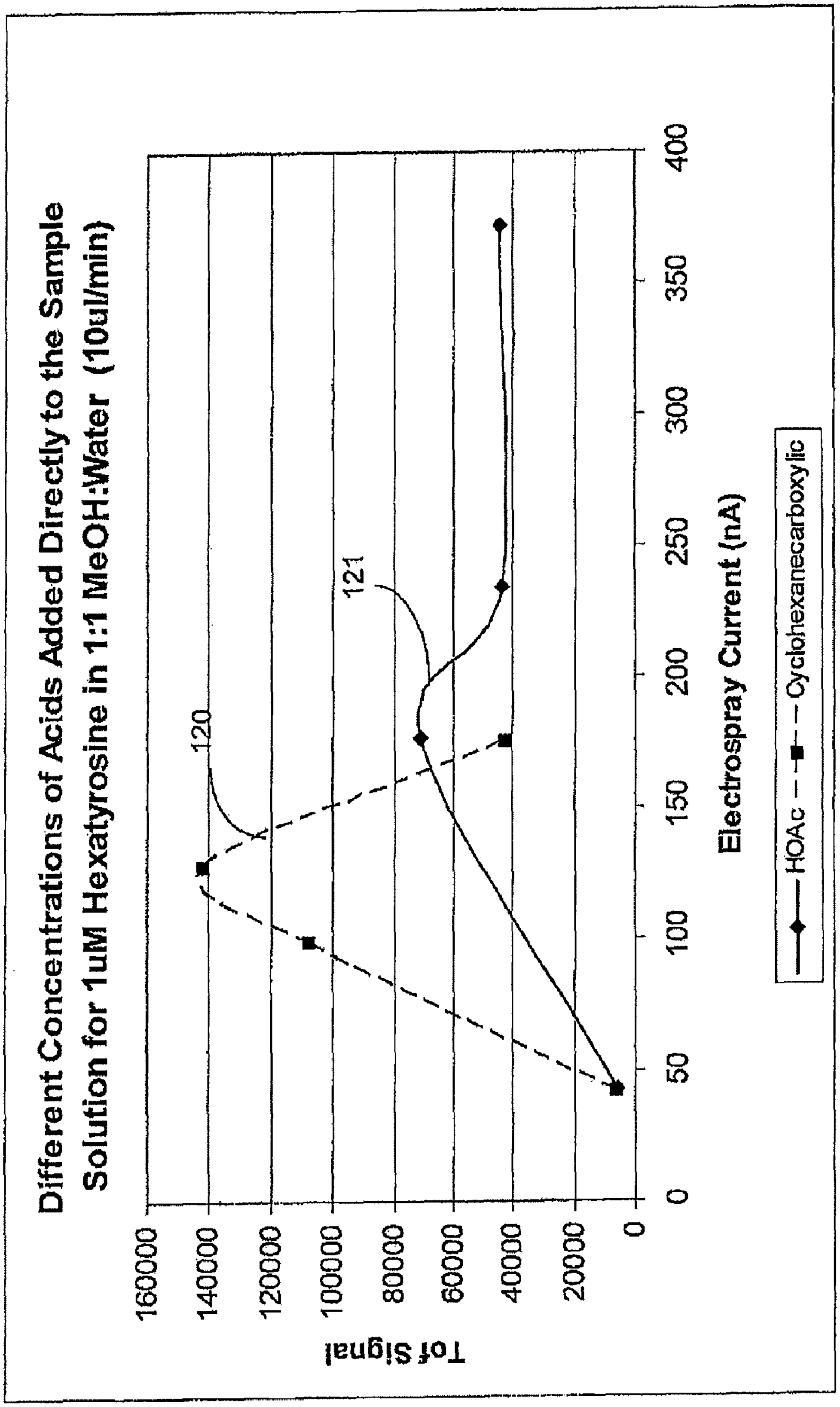
FIG. 9 shows a set of ESMS signal curves comparing ESMS ion signal of a 1 μM hexatyrosine in a 1:1 methanol: water solution electrosprayed at a flow rate of 10 μl/min for different concentrations of acetic acid and cyclohexanecarboxylic acid added directly to the sample solution.

Electrospray MS signal response curves 120 and 121 for 1 μM hexatyrosine sample in a 1:1 methanol:water solutions are shown in FIG. 9. Curve 121 was generated by electrospraying different sample solutions containing different concentrations of conventional electrolyte acetic acid. Curve 120 was generated by electrospraying different sample solutions containing different concentrations of new electrolyte cyclohexanecarboxylic acid. The maximum hexatyrosine ESMS signal achieved with new electrolyte cyclohexanecarboxylic acid was over two times higher than the maximum hexatyrosine signal achieved with conventional electrolyte acetic acid.

Three ESMS signal response curves using electrospray membrane probe 30 for 1 hexatyrosine sample in 1:1 methanol:water solutions are shown in FIG. 10. Curve 122 was generated by running a concentration gradient of acetic acid in the electrospray membrane probe second solution flow. Over a factor of two increase in hexatyrosine signal was achieved by running a concentration gradient of benzoic acid in the second solution of the electrospray membrane probe as shown by signal response curve 123. The addition of inorganic electrolytes to the sample solution generally reduces the analyte signal response for a given electrospray total ion current. Hexatyrosine signal response curve 124 was acquired with 0.001% trifluoroacetic acid (TFA) added to the sample solution while running a concentration gradient of benzoic acid in the electrospray membrane probe second solution. The electrospray total ion current of approximately 100 nA was measured at data point 125 on curve 124. A data point 125, the electrospray signal of hexatyrosine was lower with 0.001% TFA added to the sample solution compared with the ESMS signal response with acetic acid added to the ES membrane probe second solution. Very low concentration benzoic acid was added to the second solution when data point 125 was acquired. Increasing the concentration of benzoic acid in the second solution increased the hexatyrosine signal overcoming the ESMS signal reducing effect of TFA in the sample solution. Even with 0.001% TFA added to the sample solution, the addition of new electrolyte benzoic acid to the second solution of an ES membrane probe increases the hexatyrosine ESMS signal to a maximum of over two times the maximum hexatyrosine ESMS signal achieved with acetic acid added to the second solution.

FIG. 11 shows negative ion polarity ESMS signal response curves for 1 μM hexatyrosine sample in 1:1 methanol:water solutions run using an electrospray membrane probe. Curve 127 was acquired while running a concentration gradient of acetic acid in the second solution. Signal response curve 128 was acquired while running a concentration gradient of benzoic acid in the second solution of electrospray membrane probe 30. The maximum negative ion polarity hexatyrosine ESMS signal acquired with new electrolyte benzoic acid was over two times the maximum ESMS signal achieved with conventional electrolyte acetic acid.

1 μM reserpine sample in 1:1 methanol:water solutions were electrosprayed to generate the ESMS signal response curves shown in FIG. 12. New electrolytes benzoic acid and trimethyl acetic acid and conventional electrolyte acetic acid were added at different concentrations to different sample solutions to compare ESMS signal response. As shown by reserpine ESMS signal response curves 127, 128 and 129, a two times signal increase can be achieved when new electrolyte species benzoic acid and trimethyl acetic acid are added to the sample solution compared to the ESMS signal achieved by electrospraying with conventional electrolyte acetic acid added to the sample solution.

A comparison of ESMS signal response for 1 μM leucine enkephalin sample in 1:1 methanol:water solutions using four electrolytes added to the sample solution is shown in FIG. 13. New electrolytes, benzoic acid, trimethyl acetic acid and cyclohexane carboxylic acid and conventional electrolyte acetic acid were added at different concentrations to different leucine enkephalin sample solutions to generate ESMS signal response curves 130, 131, 132 and 133 respectively. When running the new electrolytes, a maximum leucine enkephalin signal response increase of two times was achieved compared with the maximum signal response achieved with electrolyte acetic acid. Individually, a factor of three increase in leucine enkephalin ESMS maximum signal response, was achieved by adding benzoic acid to the sample solution.

A characteristic of the new electrolytes is the presence of an $(M+H)^+$ electrolyte parent ion peak ion in the ESMS spectrum acquired in positive ion polarity electrospray as shown in FIGS. 14A, 15A and 16A for benzoic acid, trimethyl acetic acid and cyclohexanecarboxylic acid respectively. Such a parent positive ion is not generally observed when running conventional electrolytes in electrospray ionization. As expected, the presence of an $(M-H)^-$ electrolyte species peak was observed in the ESMS spectrum acquired in negative ion polarity mode as shown in FIGS. 14B, 15B and 16B. The presence of gas phase electrolyte parent ions present in positive ion polarity electrospray may play a role in increasing the ESMS analyte signal.

ESMS negative polarity ion signal amplitude can be increased for specific analyte species in solution by using the electrospray membrane probe by adding ammonium hydroxide and/or sodium, hydroxide to the ES membrane probe second solution during electrospray ionization. A comparison of the negative ion polarity ESMS signal response for 100 pg/μl reserpine in a 30:70 acetonitrile:water sample solution with electrolyte base, ammonium hydroxide, added directly to the sample solution and added only to the electrospray membrane probe second solution. Curve 141 was generated by electrospraying a 100 pg/μl reserpine in 30:70 acetonitrile:water sample solution with increasing concentrations of base electrolyte, ammonium hydroxide, added directly to the sample solution. Curve 140 was generated by running a gradient of base electrolyte, ammonium hydroxide, concentration in a aqueous second solution of an electrospray membrane probe while electrospraying a 100 pg/μl reserpine in a 30:70 acetonitrile:water sample solution. The concentration gradient of ammonium hydroxide in the second solution started at 0% and increased to 1.0%. As shown in FIG. 17, the addition of the electrolyte base, ammonium hydroxide to the electrospray membrane probe second solution increased the negative ion polarity ESMS signal of reserpine over a factor of 3.8 compared with the maximum ESMS signal achieved from reserpine with ammonium hydroxide added directly to the sample solution.

A comparison of the negative ion polarity ESMS signal response for 100 pg/μl reserpine in a 50:50 acetonitrile:water sample solution with electrolyte base, sodium hydroxide, added directly to the sample solution and added only to the electrospray membrane probe second solution. Curve 143 was generated by electrospraying a 100 pg/μl reserpine in 50:50 acetonitrile:water sample solution with increasing concentrations of base electrolyte, sodium hydroxide, added directly to the sample solution. Curve 142 was generated by running a gradient of base electrolyte, sodium hydroxide, concentration in a aqueous second solution of an electrospray membrane probe while electrospraying a 100 pg/μl reserpine in a 50:50 acetonitrile:water sample solution. The concentration gradient of sodium hydroxide in the second solution started at 0.005% and increased to 1.0%. As shown in FIG. 18, the addition of the electrolyte base, sodium hydroxide to the electrospray membrane probe second solution increased the negative ion polarity ESMS signal of reserpine over a factor of fourteen compared with the maximum ESMS signal achieved from reserpine with ammonium hydroxide added directly to the sample solution.

The use of new electrolytes benzoic acid, trimethyl acetic acid and cyclohexanecarboxylic acid increases ESMS signal amplitude for samples run in positive or negative ion polarity electrospray ionization. An increase in electrospray MS analyte signal can be achieved by adding a new electrolyte directly to the sample solution or by running a new electrolyte in the second solution of an electrospray membrane probe during electrospray ionization. Running electrolyte bases, ammonium hydroxide and sodium hydroxide in the second solution of an electrospray membrane probe during negative ion polarity electrospray ionization increases the electrospray mass spectrometer signal amplitude of analyte species. Having described this invention with respect to specific embodiments, it is to be understood that the description is not meant as a limitation since further modifications and variations may be apparent or may suggest themselves. It is intended that the present application cover all such modifications and variations.

We claim:

1. A system, comprising:

a first fluid delivery system containing a first solution including at least one of benzoic acid, trimethyl acetic acid, cyclohexanecarboxylic acid, ammonium hydroxide and sodium hydroxide;

a second fluid delivery system containing a second solution of an electrospray membrane probe including at least one of ammonium hydroxide or sodium hydroxide an ionization source; and one or more conduits configured to direct the first solution from the first fluid delivery system to the ionization source, wherein the system increases a mass spectrometry analyte ion signal generated in the ionization source.

2. The system of claim 1, wherein said first solution is a sample solution and includes at least one of benzoic acid, trimethyl acetic acid or cyclohexanecarboxylic acid.

3. The system of claim 2, wherein said ionization source is an electrospray ion source.

4. The system of claim 2, wherein the second solution includes ammonium hydroxide.

5. The system of claim 1, wherein said ionization source is an atmosphere pressure chemical ionization (APCI) source, the first solution is a sample solution, and the first solution includes at least one of benzoic acid, trimethyl acetic acid or cyclohexanecarboxylic acid.

6. The system of claim 1, wherein the second solution contains the first solution.

7. The system of claim 1, wherein the second solution includes sodium hydroxide.

8. The system of claim 5, further comprising a delivery system to include said acid in a reagent ion source solution.

9. A system, comprising:

a first fluid delivery system containing a first solution including at least one of electrolyte species benzoic acid, trimethyl acetic acid, cyclohexanecarboxylic acid, ammonium hydroxide and sodium hydroxide;

a second fluid delivery system containing a second solution of an electrospray membrane probe including ammonium hydroxide;

an ionization source; and one or more conduits configured to direct the first solution from the first fluid delivery system to the ionization source, wherein the system is configured to increase a mass spectrometry analyte ion signal generated in the ionization source.

10. A system, comprising:

a first fluid delivery system containing a first solution including at least one of electrolyte species benzoic acid, trimethyl acetic acid, cyclohexanecarboxylic acid, ammonium hydroxide and sodium hydroxide;

a second fluid delivery system containing a second solution of an electrospray membrane probe including sodium hydroxide;

an ionization source; and one or more conduits configured to direct the first solution from the first fluid delivery system to the ionization source, wherein the system is configured to increase a mass spectrometry analyte ion signal generated in the ionization source.

* * * * *

UNITED STATES PATENT AND TRADEMARK OFFICE

CERTIFICATE OF CORRECTION

PATENT NO. : 8,378,295 B2
APPLICATION NO. : 13/078578
DATED : February 19, 2013
INVENTOR(S) : Craig M. Whitehouse, Thomas P. White and Shida Shen It is certified that error appears in the above-identified patent and that said Letters Patent is hereby corrected as shown below:

On the title page, column 2 (Other Publications), line 2, delete "Dissertaions" and insert -- Dissertations --, On the title page, column 2 item [57] (Abstract), line 9, delete "ES MS" and insert -- ESMS --, In the Claims:

In column 13, line 35, claim 1, delete "hydroxide" and insert -- hydroxide; --,

In column 14, line 6, claim 5, delete "atmosphere" and insert -- atmospheric --.

Signed and Sealed this
Twentieth Day of August, 2013

Teresa Stanek Rea
*Acting Director of the United States Patent and Trademark Office*